United States Patent
Magerramov et al.

(10) Patent No.: US 10,122,578 B1
(45) Date of Patent: Nov. 6, 2018

(54) CONFIGURATION PROPAGATION DEPLOYMENT POLICY

(71) Applicant: AMAZON TECHNOLOGIES, INC., Seattle, WA (US)

(72) Inventors: Joseph E. Magerramov, Bellevue, WA (US); Richard Hazen Galliher, III, Seattle, WA (US); Rebecca Claire Weiss, Vienna, VA (US); Diwakar Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 15/083,164

(22) Filed: Mar. 28, 2016

(51) Int. Cl.
*G06F 15/16* (2006.01)
*H04L 12/24* (2006.01)

(52) U.S. Cl.
CPC .............................. *H04L 41/0813* (2013.01)

(58) Field of Classification Search
CPC ................................................. H04L 41/0813
USPC ....................................................... 709/221
See application file for complete search history.

(56) References Cited

U.S. PATENT DOCUMENTS

| | | | | |
|---|---|---|---|---|
| 8,713,295 B2* | 4/2014 | Bax | ...................... | G06F 9/4405 713/1 |
| 9,712,486 B2* | 7/2017 | Johnson | ..................... | G06F 8/60 |
| 9,747,183 B2* | 8/2017 | Bhattacharya | ...... | G06F 11/3027 |
| 9,820,152 B2* | 11/2017 | Myers | .................... | H04W 12/08 |
| 2014/0201642 A1* | 7/2014 | Vicat-Blanc | ............ | H04L 41/22 715/736 |
| 2015/0160948 A1* | 6/2015 | Marr | ......................... | G06F 8/65 713/2 |
| 2015/0186206 A1* | 7/2015 | Bhattacharya | ...... | G06F 11/3027 714/3 |
| 2015/0350019 A1* | 12/2015 | Terayama | ........... | H04L 41/0816 709/221 |
| 2016/0315803 A1* | 10/2016 | Sadana | ................. | H04L 41/082 |
| 2016/0352572 A1* | 12/2016 | Mishra | ................ | H04L 41/0853 |
| 2016/0373302 A1* | 12/2016 | Sigoure | ............... | H04L 41/0856 |
| 2017/0118041 A1* | 4/2017 | Bhattacharya | ........ | H04L 12/462 |
| 2017/0264509 A1* | 9/2017 | Wanser | ................... | H04L 43/08 |
| 2017/0272316 A1* | 9/2017 | Johnson | ............... | G06Q 10/103 |

* cited by examiner

*Primary Examiner* — Melvin H Pollack
(74) *Attorney, Agent, or Firm* — Blank Rome LLP

(57) ABSTRACT

A system for propagating network configuration changes in a distributed computing system includes one or more processors and memory that includes instructions, that when executed by the one or more processors, cause the processors to receive a configuration propagation instructions from a client, receive a network configuration change request from the client, generate a first command instruction, and transmit the first command instruction to one or more of a plurality of network devices in accordance with the configuration propagation instruction. The first command instruction instructs the plurality of network devices to change state from a first state to a second state. The second state corresponds with a network configuration contained in the network configuration change request.

21 Claims, 13 Drawing Sheets

CONFIGURATION PROPAGATION DEPLOYMENT POLICY

BACKGROUND

Many companies and organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In many cases, the functionality and usability of applications that run on such platforms may rely extensively on network communications with other parts of the provider network, and/or with external entities such as clients or third parties.

In many of these distributed computing networks, clients have the ability to customize configurations (e.g., mapping) of their specific network resources. For example, a client may be able to set specific subroutes, subnets, elastic Internet Protocol (IP) addresses, private IP addresses, etc. Thus, the distributed network may receive configuration data from the client. This configuration data then may be transmitted (pushed or pulled) to network devices which implement the client's requested network configuration.

BRIEF DESCRIPTION OF THE DRAWINGS

For a detailed description of various examples, reference will now be made to the accompanying drawings in which.

DETAILED DESCRIPTION

Figure 1:
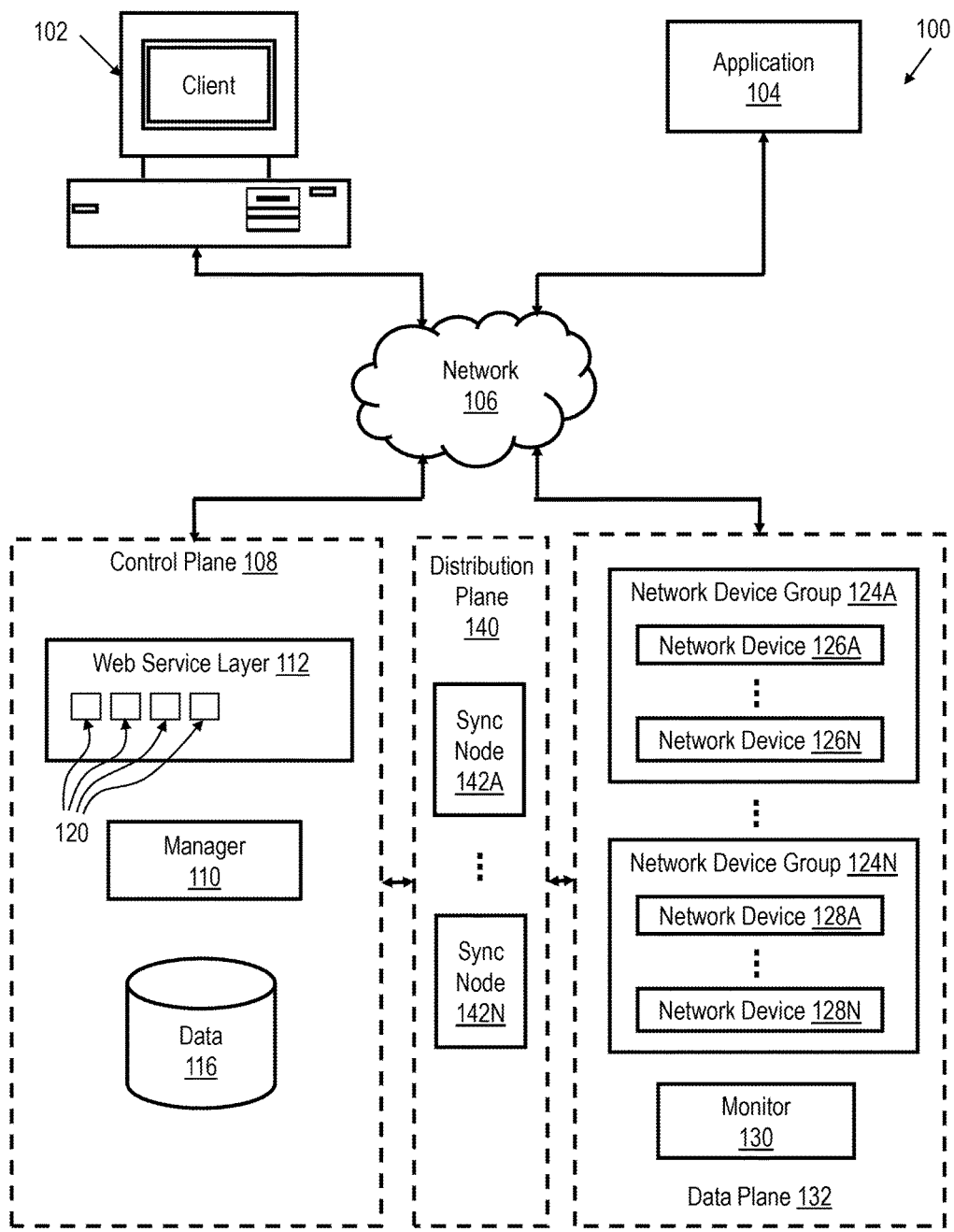
FIG. 1 shows a block diagram of a distributed computing environment which facilitates providing access to various resources of the distributed computing environment, in accordance with various embodiments.

In large-scale distributed systems, clients may have the ability to customize the mapping of their specific network resources, which can be implemented in a provider network as virtual networks that run over an underlying physical network. For example, a client may be able to set specific subroutes, subnets, elastic Internet Protocol (IP) addresses, private IP addresses, etc. for virtual networks. Thus, the distributed network receives such configuration data from the client. This configuration data then may be translated into command instructions to configure the underlying physical network and transmitted (pushed or pulled) to network devices which implement the client's requested configuration. Network devices may include routers, switches, network address translation router (NAT), integrated access devices, or any other networking infrastructure utilized for communications within the network and from and to the network. For example, configuration data may be transmitted to a network device, which may cause the routing table within the network device to be overridden with new state information corresponding to the requested network configuration. This may cause the network device to route packets to different parts of the physical network and/or onto the Internet in accordance with the client's requested configuration. However, corrupted configuration data or accidental configuration requests may cause network degradation. Therefore, it is desirable that the network devices be capable of quickly cancelling a configuration request and/or reverting to their state prior to the configuration request.

Various embodiments of methods and apparatus for monitoring network traffic as a network configuration request is implemented by various network devices in a large-scale distributed system are described. In some embodiments, a client may transmit a network configuration request to the distributed system. Prior to or in conjunction with the network configuration request, the client may also transmit configuration propagation instructions to the distributed system. The configuration propagation instructions may provide a rate at which changes to the network devices are to occur to implement the network configuration request. In other words, the configuration propagation instructions may contain information indicative of a number of network devices to receive state changes per unit of time. For example, configuration propagation instructions may instruct the distributed system to propagate any requested changes to the network devices at a rate of one network device per minute. Thus, the velocity of distribution of network changes is controlled. While the changes are propagated to the network devices, a monitor may monitor the network to determine whether network traffic is being affected by the network changes. If network performance drops below a threshold value, then the system may cancel further propagation of the changes to any additional network devices. Additionally, the system may automatically cause any of the network devices that implement the changes to revert to their immediate prior state (i.e., the state the network device was in immediately prior to receiving the network change request). In this way, the system may decrease the velocity of the implementation of a network change and monitor the performance of the network to ensure the change is correct. Thus, the system may reduce network degradation caused by an incorrect change request.

In much of the following description, a provider network is used as an example of a distributed system in which the centralized networking configuration techniques may be implemented. Virtual networks set up by an entity such as a company or a public sector organization to provide one or more network-accessible services (such as various types of cloud-based database, computing or storage services) accessible via the Internet and/or other networks to a distributed set of clients may be termed "provider networks" herein. At least some of the services may be packaged for client use in service units called "instances": for example, a virtual machine instantiated by a virtualized computing service may represent a "compute instance," and a storage device such as a block-level volume instantiated by a storage service may be referred to as a "storage instance." In some embodiments, instances of higher-level services may be packaged using compute instances and/or storage instances—e.g., a database instance may be built using a combination of compute and storage instances in some embodiments. Computing devices such as servers and/or storage devices at which such units of various network-accessible services of a provider network are implemented may be referred to herein as "instance hosts" or more simply as "hosts." In the remainder of this document, the term "client," when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network.

A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network, and/or from devices within the provider network. In at least some embodiments, a virtualized computing service offering various types of compute instances may be implemented within the provider network, and such compute instances may be allocated to clients. Other services of the provider network may be accessed from such compute instances as well as from external locations. It is noted that although provider networks serve as one example context in which many of the validation techniques described herein may be implemented, those techniques may also be applied to other types of distributed systems than provider networks, e.g., to large-scale distributed application environments in which different components of the applications may have time-varying bandwidth needs.

FIG. 1 shows a block diagram of an environment 100 for providing access to various resources in a distributed computing environment, in accordance with various embodiments. Systems and methods in accordance with one embodiment provide at least one resource access gateway, or control plane, either as part of the data environment or in a path between the user and the data plane via a distribution plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a provider network without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 108 can be used in some environments to provide and/or manage access to various resources in the data plane 132. In a distributed computing environment, this can correspond to a manager 110 or similar system that manages access to the various resources in the provider network. In one embodiment, a set of application programming interfaces (APIs) 120 or other such interfaces are provided that allow a user or customer to make requests for access to various resources. Additionally, the APIs 120 allow a user, through client 102, to make network configuration requests, network configuration change requests, and/or provide configuration propagation instructions. For example, a user may request specific network mapping, subroutes, subnets, elastic IP addresses, private IP addresses, etc. A user may also request a change to a specific network mapping, subroutes, subnets, elastic IP addresses, private IP addresses, etc. Furthermore, a user may provide instructions that indicate a rate at which any change to the network configuration is to propagate through the devices of the network. Once access is established, a resource is allocated, etc., a user can communicate directly with the resource to perform certain tasks relating to that resource, such as data storage or processing. The user can use direct interfaces or APIs to communicate with data instances, hosts, or other resources once access is established, but uses the control plane component(s) to obtain the access.

In this example, a computing device 102 for an end user is shown to be able to make calls through a network 106 to a control plane 108 (or other such access layer) to perform a task such as to obtain access to a specified resource or resource type and/or to request a specific network configuration and/or a change to the network configuration. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data, control, and distribution "plane," it should be understood that this can refer to an actual or virtual separation of at least some resources (e.g., hardware and/or software) used to provide the respective functionality. Further, the control plane 108 can be considered to be part of the data plane 132 and/or distribution plane 140 in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs 120 (or other such interfaces) for receiving Web services calls or other such requests from across the network 106, which a Web services layer 112 can parse or otherwise analyze to determine the steps or actions needed to act on or process the call. For example, a Web service call might be received that includes a request for a specific network mapping and/or a change to a network mapping as part of a network configuration option. In this example, the Web services layer can parse the request to determine the type of connection or access needed, the appropriate type(s) of resource needed, or other such aspects.

The control plane can include one or more resource allocation managers 110, each responsible for tasks such as validating the user or client associated with the request and obtaining or allocating access to the appropriate resource(s). Such a system can handle various types of requests and establish various types of connections. Such a system also can handle requests for various types of resources, such as specific graphic processors or other types of hardware or hardware functionality, and can provide access to the appropriate resource(s). Components of the data plane 132, or the resource layer of the service provider environment, may perform the necessary tasks to allocate virtual machine instances residing on the data plane 132 in response to customer requests. For allocation of an instance, for example, the manager 110 can be configured to provision an instance (e.g., a virtual machine) by selecting a host to run the instance, sending a command to a server manager (e.g., virtualization system such as a hypervisor), to launch the instance, and any other set-up operations, such as allocating a volume of off-instance persistent storage, attaching the persistent storage volume to the instance, and allocating and attaching a public IP address, network interface, or other address, port, interface, or identifier for the instance. For tasks such as obtaining processing of an instruction using a particular type of hardware, for example, the components of the data plane 132, in conjunction with the control plane 108, can perform actions such as provisioning a device for a user and providing shared and/or dedicated access to the resource for a period of time at a particular level of access to the resource. Whenever a user requests implementation of a particular network configuration, data store 116 stores specific state information for each of the devices needed to implement the requested network configuration. Furthermore, the data store 116 may store any configuration propagation instructions received from client 102. It should be understood that the data store 116 can be a separate data store or a portion of another data store.

In various embodiments, as discussed, the data plane 132 takes the form of (or at least includes or is part of) a service provider environment, or a set of Web services and resources that provides data storage and access across a network of hardware and/or software components. An IP address derived from DNS mappings is beneficial in such a service provider environment, as instance or availability failures, for example, can be masked by programmatically remapping the IP address to any appropriate replacement instance for a use. A request received from a client 102 or application 104 to remap the provider network that may take the form of a network configuration change request, for example, can be directed to and distributed to any of network device groups 124A-N or to multiple network device groups to actuate the remapping. Each of the network device groups 124 contain various network devices 126A-N in network device group 124A and 128A-N in network device group 124N, such as routers, switches, ports, network address translation routers (NAT), integrated access devices, or any other networking infrastructure utilized for communications within the network and from and to the network. In some examples, a network device may take the form of an edge device (i.e., a device that provides an entry point into the provider network). An "edge device" as used herein can refer to any device in hardware and/or software capable of receiving a packet of information from outside the provider network, and/or capable of transmitting a packet of information from inside the provider network. For example, any device that is capable of receiving and/or transmitting a packet of information from data plane 132 to client 102 is an edge device.

In some embodiments, each of the network devices of a particular network device group 124A are related to one another based on their functionality. For example, network devices 126A-N of network device group 124A may be related to providing web server functionality for client 102, and network devices 128A-N of network device group 124N may be related to providing security functionality for the client 102's instances.

The network configuration change request may be propagated to the network devices in accordance with the configuration propagation instructions. In other words, the configuration propagation instructions may contain information indicative of a number of network devices to receive state changes per unit of time. For example, the configuration propagation instructions may provide instructions that any network change directed to network devices in network device group 124A will be propagated to only one network device per minute. Then, in accordance with those configuration propagation instructions, the network configuration change will be propagated to the network devices 126A-N at a rate of one per minute. Once received, the network devices 126A-N and/or 128A-N, within the network device group 124, may then implement the network configuration request (e.g., implement the remapped IP addresses and route packets in accordance with the remapped configuration). Such an approach allows for instances to be dynamically moved, updated, replicated, etc., without requiring the user or application to change the IP address or other address used to access the instance because the service provider environment is operable to updating routing tables in networking devices in the provider network to reflect the change in the IP address.

For example, a client may request a change to a specific network configuration. The control plane 108 then may store state information for the network devices 126A-N and/or 128A-N in network device groups 124 that corresponds to the network configuration associated with the client request in data store 116. In other words, in order to implement the network configuration associated with the client request, the network devices must be placed into a certain state. The state that the network devices must be placed in order to implement the network configuration associated with the client request is stored in data store 116. The control plane 108 then may generate a command instruction that instructs the network device to configure itself to the state corresponding to the network configuration associated with the client request that is stored in data store 116. For example, the network configuration associated with the client request may require that a network device alter its state (i.e., the stored information within the network device at a given instant in time). A command instruction then may be generated by the control plane 108. The command instruction may contain the information or state that the network devices need to implement the network configuration request. Thus, in an example, the command instruction may contain an instruction for the network devices to route specific packets utilizing a certain mapping. Thus, in this example, the command instruction may contain a request to change an elastic IP address or a private IP address in a group of network devices, such as network devices 126A-N in network device group 124A. The command instruction is transmitted from control plane 108 to each of the devices in network device group 124A at a rate provided by the configuration propagation instructions (e.g., one network device per minute). Once the command instruction is received, the network devices 126A-N of the network device group 124A may implement the network configuration contained in the command instruction.

In alternative embodiments, the network devices 126A-N and/or 128A-N may receive from control plane 108 the network configuration change request. For example, instead of, or in conjunction with receipt of a command instruction from the control plane 108, the networking devices may receive the network configuration option associated with the network configuration change request or state information required to implement the network configuration associated with the network configuration change request. In this example, after being stored in data store 116, the state information is directly transmitted from the control plane 108 to the network devices 126A-N and/or 128A-N at a rate provided by the configuration propagation instructions (e.g., one network device per minute).

Monitor 130 may be configured to monitor the network traffic generated by, received by, and/or transmitted between the network devices 126A-N and/or 128A-N of the network device groups 124A-N. For example, the monitor 130 may be any device in hardware and/or software capable of determining the number of data packets and/or the number of bytes transferred into and out of each of network devices 126A-N and/or 128A-N. The monitor 130 may also be configured to determine the number of data packets dropped amongst the network devices 126A-N for network device group 124A and/or the network devices 128A-N for network device group 124N and/or the number of data packets allowed (i.e., received) amongst the network devices 126A-N for network device group 124A and/or the network devices 128A-N for network device group 124N. The monitor 130 may also compare the amount of network traffic generated by, received by, and/or transmitted between the network devices 126A-N and/or 128A-N of the network device groups 124A-N to a threshold value. For example, the monitor 130 may compare the number of data packets dropped amongst the network devices 126A-N over a predetermined time period to a threshold value. This monitoring may occur while the command instruction that implements the network configuration change request is propagating at a rate determined by the configuration propagation instructions to the network devices 126A-N and/or 128A-N.

The threshold value may be provided in the configuration propagation instructions, may be programmatically entered into monitor 130 through other instructions, and/or may be determined by the monitor 130 based on historical data (e.g., based on the average and/or median number of packets dropped during the predetermined time period over several days). In some embodiments, the threshold value may be expressed in absolute terms (e.g., the actual number of data packets dropped) while in other embodiments, the threshold value may be expressed as a percentage (e.g., a percentage of the number of data packets dropped during the predetermined time period 24 hours prior to the current value or a percentage of the average number of packets dropped during the predetermined time period over several days). If monitor 130 determines that the network traffic of the network devices 126A-126N and/or 128A-128N is outside of the threshold value (e.g., greater than or less than), then the monitor 130 may generate an alarm. In other words, if the amount of network traffic is outside a predetermined threshold value, then monitor 130 may generate an alarm.

The alarm may be transmitted to the manager 110 of control plane 108. The manager 110 may then cancel transmission of the command instruction containing the network configuration change request. Thus, any remaining network devices 126A-N and/or 128A-N that have yet to receive the command instruction will not receive the command instruction. For example, control plane 108 may receive a network configuration change request from client 102 requesting a change to the network configuration for all network devices in network device group 124A. As a command instruction that contains the network configuration change request is propagated to the network devices 126A-N at a rate provided by configuration propagation instructions (e.g., one network device per minute), an alarm may be generated by monitor 130 because the amount of network traffic is outside a threshold value (e.g., a number of dropped packets exceeds a dropped packet threshold value). At the time the alarm is generated, only two network devices may have received the command instruction and changed state to implement the network configuration change request. The manager 110 may receive the alarm from monitor 130 and stop transmission (i.e., cancel the transmission) of the command instruction to any additional network devices 126A-N that have yet to receive the command instruction. If 100 network devices are a part of network device group 124A, then 98 of the network devices will not have received the command instruction and will remain in the same state as when the network configuration change request was received from the client 102. Additionally, in some embodiments, the manager 110 may cause any network device 126A-N that has received the command instruction, but has yet to implement the instruction to not implement (cancel) the instruction.

In some embodiments, instead of cancelling the transmission of the command instruction or in addition to cancelling the transmission of the command instruction, the manager 110, in response to receiving the alarm, may cause the control plane 108 to generate a second command instruction that instructs the network devices 126A-N and/or 128A-N that have already received the original command instruction and implemented the network configuration change request to be configured in the network device's immediately preceding state. In other words, in response to receiving the alarm, the control plane 108 may generate a command instruction that causes the network devices 126A-N and/or 128A-N that have already received the original command instruction and implemented the network configuration change request to revert to the state the network devices were in prior to implementing the network configuration change request. Continuing the previous example, in addition to cancelling transmission of the command instruction, a second command instruction may be generated that causes the two network devices that have received the original command instruction and changed state to implement the network configuration change request to revert back to their immediate previous state. The second command instruction then may be transmitted to those two network devices. Those two network devices then may implement the second command instruction and revert to their immediate previous state. Thus, all 100 network devices 126A-N of network device group 124A are in the same state as when the network configuration change request is initially received from client 102. Hence, the network configuration of the network device group 124A is the same as if a network configuration change request was never received from the client 102.

In alternative embodiments, the data plane 132 may maintain a journal of updates that chronicles past and current state information for the network devices 126A-N and/or 128A-N. As in other embodiments, in order to change a network configuration of the network devices, a command instruction may be propagated to the network devices at a rate per unit of time in accordance with the received configuration propagation instructions instructing the network devices to change state to implement the network configuration change request. Once a command instruction is received from the control plane 108 instructing any of network devices 126A-N and/or 128A-N to change state, and as each network device changes state in accordance with the command instruction, the journal may be updated to reflect the change in state. In order to confirm that the command instruction is to continue to be propagated to the network devices 126A-N and/or 128A-N and to confirm that the state changes implemented by the network devices are to be maintained, the manager 110 may be configured to transmit a commit signal to the data plane 132. Monitor 130 may be configured to monitor for the commit signal. If after a commit signal threshold amount of time elapses after the first command instruction implementing the network configuration change request is received in the data plane 132, then the monitor 130, utilizing the journal to determine the immediate prior state, automatically reverts the network devices to the state they were in immediately prior to implementing the network configuration change request.

The environment 100 may also include a distribution plane 140 which supports communications from control plane 108 to the data plane 132. While shown separately, distribution plane 140 may be integrated into control plane 108 and/or data plane 132. In this configuration, distribution plane 140 may enable communications of state information needed to implement a client's network configuration change request that is stored in data store 116 from control plane 108 to the networking devices in networking group 124 in data plane 132. Distribution plane 140 may include synchronization nodes 142A-N.

Synchronization nodes 142 are nodes that are configured to distribute the command instructions received from the control plane 108, or in some embodiments, the network configuration change request, to the network devices 126A-N and/or 128A-N of the network device groups 124 in the data plane 132. In some embodiments, one synchronization node is allocated to each network device group 124A-N. For example, a single synchronization node 142A may be allocated to transmit command instructions to each device in network device group 124A while synchronization node 142N is allocated to transmit command instructions to each device in network device group 124N.

Each of the synchronization nodes 142A-N may contain push logic and pull logic to enable the distribution of the command instructions. Push logic may include hardware and/or software that causes control plane 108 to periodically transmit or "push" data stored in a data store to data plane 132. For example, the push logic may cause control plane 108 to push state information stored in data store 116 and corresponding to a client's networking configuration option to the networking groups 124 every 10 seconds. Alternatively, the push logic may cause control plane 108 to push data stored in a data store to data plane 132 in response to an event. For example, the push logic may cause control plane 108 to push state information stored in data store 116 and corresponding to a client's networking configuration option to the network device groups 124 every time that the stored state information changes. Thus, in some embodiments, if a user of client 102 enters network configuration data which, if implemented would alter the state of any of the network devices in any of the network device groups 124, the state information stored in data store 116 will change. This may cause the push logic to push the updated state information to network devices 126A-N and/or 128A-N.

The pull logic may be hardware and/or software that causes control plane 108 to transmit data stored in a data store to data plane 132 in response to a request from data plane 132. For example, one or more network devices 126A-N and/or 128A-N may request state information stored in data store 116. In response to the request, the pull logic will "pull" the state information from the data store 116 and provide that information to network device groups 124. In these ways, the network device groups 124 are capable of receiving data from the control plane 108. Similarly, the synchronization nodes 142A-N may be utilized to distribute alarms from monitor 130 of data plane 132 to the control plane 108.

Figure 2:
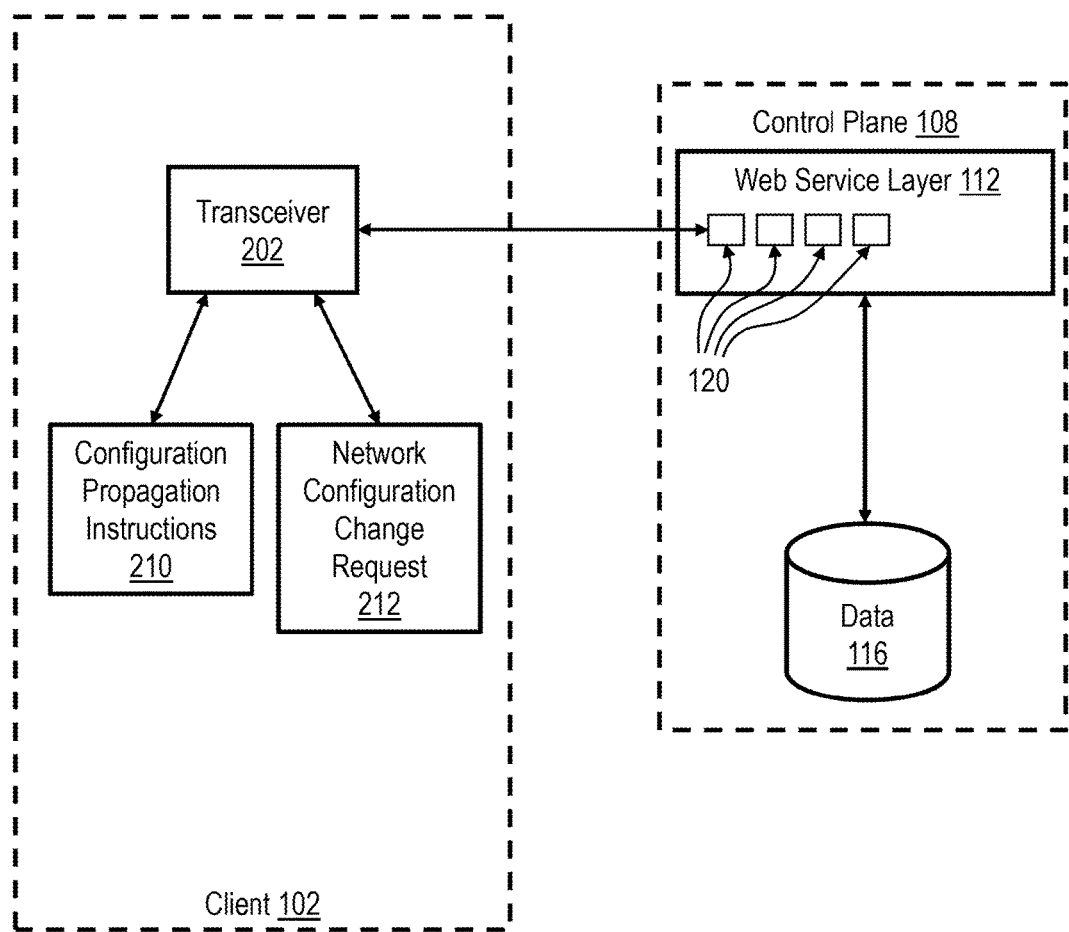
FIG. 2 shows an example of an interaction between a client and devices of a control plane in a distributed computing environment, in accordance with various embodiments.

FIG. 2 shows an example of an interaction between client 102 and control plane 108 in distributed computing environment 100, in accordance with various embodiments. As discussed previously, client 102 may transmit, via transceiver 202, configuration propagation instructions 210 and a network configuration change request 212 to the control plane 108 which may utilize APIs 120 of Web service layer 112 to receive configuration propagation instructions 210 and a network configuration change request 212. Transceiver 202 is configured to transmit the configuration propagation instructions 210 and the network configuration change request 212 to the control plane 108. Transceiver 202 may be any type of transceiver including a wired and/or wireless transceiver. More specifically, transceiver 202 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications.

Configuration propagation instructions 210 may provide a rate of propagation for network device implementation of network configuration change requests. In other words, the configuration propagation instructions 210 may provide the rate in which command instructions containing a network configuration change request 212 are distributed to different network devices in data plane 132. The network configuration change request 212 may comprise a request to change a specific network mapping, subroutes, subnets, elastic IP addresses, private IP addresses, etc. In some embodiments, the configuration propagation instructions 210 are provided as an API to control plane 108 at the request of client 102. Thus, the configuration propagation instructions 210 may act as global instructions that control propagation rates for all network configuration change requests 210. In alternative embodiments, the configuration propagation instructions 210 may be provided by the client to control plane 108 on a network configuration change request 212 by network configuration change request 212 basis. For example, client 102 may distribute configuration propagation instructions 210 to control plane 108 via transceiver 202 each time the client 102 transmits a network configuration change request 212. In some embodiments, the configuration propagation instructions 210 may be a part of the network configuration change request 212. Additionally, in some embodiments, client 102 may transmit a network configuration change request 212 without previously or concurrently transmitting configuration propagation instructions 210. In this embodiment, the control plane 108 may transmit a conformation request to client 102 that requests client 102 confirm whether client 102 is requesting to implement the network configuration change request 212 without first providing any configuration propagation instructions. The client 102 may either confirm that no configuration propagation instructions are intended or may then transmit configuration propagation instructions 210.

Figure 3:
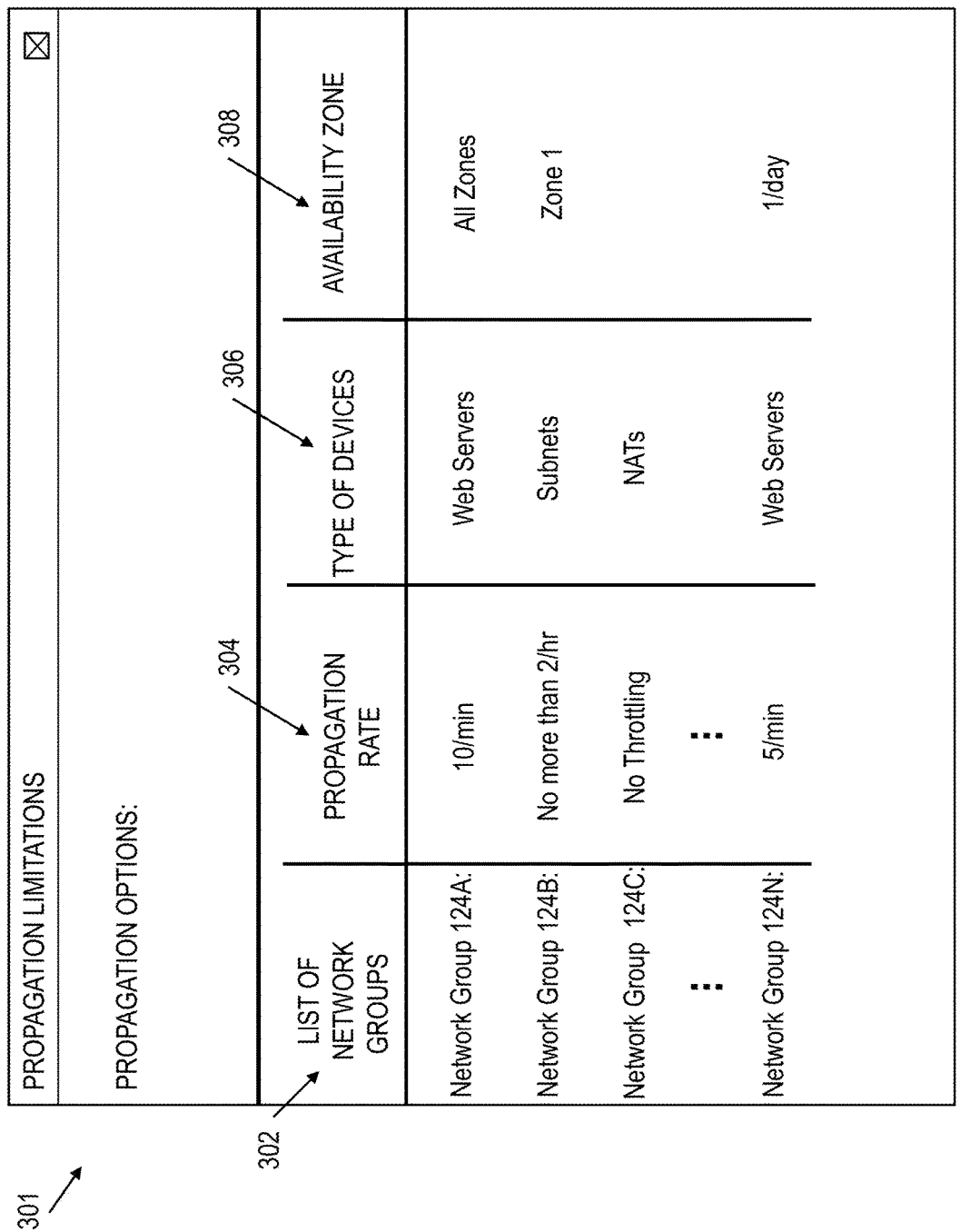
FIG. 3 shows an example dialog that displays and allows entry of propagation configuration instructions that a control plane of the distributed computing environment may obtain from a client, in accordance with various embodiments.

FIG. 3 shows an example dialog 301 that displays and allows entry of propagation configuration instructions 210 that a control plane 108 of the distributed computing environment 100 may obtain from client 102, in accordance with various embodiments. Dialog 301 may be displayed at client 102 such that a user of client 102 may input the propagation configuration instructions 210. The dialog 301 may be rendered as a web page displayed on client 102 where the content of the dialog 301 may be transferred to control plane 108.

In the dialog 301, fields 302-308 include propagation options that may be implemented once a network configuration change request 212 is received by the control plane 108 from client 102. As shown in fields 302-308, the network configuration change request 212 may specify a change of network configuration for each of a plurality of different network device groups 124A-N. For example, the network configuration change may be implemented on a network device group by network device group basis. Therefore, in field 302, each of the network device groups 124A-N that are provided for the client 102 by the distributed computing environment 100 are listed.

Fields 304-308 include specific propagation rules that client 102 may request for each network configuration change request 212 transmitted to control plane 108. In field 304, the propagation rate may be listed. For example, a user of client 102 may enter the rate at which a network configuration change is propagated to network devices in each of the network device groups 124A-N. This propagation limitation may be in the form of a reduction in the transmit rate of command instructions including the network configuration change request to network devices in the network device groups. In the example shown in FIG. 3, the user of client 102 has elected to limit the propagation of network configuration change requests 212 to network devices 126A-N in network device group 124A to ten network devices per minute. Thus, only ten of network devices 126A-N are provided command instructions containing a network configuration change request 212 every minute. Similarly, the user of client 102 has elected to limit the propagation of network configuration change requests 212 to network devices in network device group 124B to no more than two network devices per hour. Furthermore, the user of client 102 has elected not to limit the propagation of network configuration change requests 212 to network devices in network device group 124C, and the user of client 102 has elected to limit the propagation of network configuration change requests 212 to network devices in network device group 124N to five network devices per minute.

In field 306, the type of network devices contained in the each of the network device groups 124A-N are listed. In the example shown in FIG. 3, network device groups 124A and 124N are composed of web server network devices 126A-N and 128A-N for client 102, network device group 124B is composed of subnet network devices, and network device group 124C is composed of NATs. In field 308, the availability zone that the user wishes to limit the propagation rules to are listed. In some embodiments, a distributed computing system may be designed such that resources are hosted in multiple locations around the world. In these embodiments, the resources may include separate independent geographic regions each of which may include multiple availability zones. Each availability zone within a region may be isolated from other availability zones within the region. In the example shown in FIG. 3, the user of client 102 has elected to limit the propagation rate of any network configuration change to the network device group 124A to ten web server network devices per minute across all availability zones within a region. The user of client 102 has elected to limit the propagation rate of any network configuration change to the network device group 124B to no more than two subnet network devices per hour, but only in availability zone 1. The user of client 102 has elected to limit the propagation rate of any network configuration change to the network device group 124N to five web server network devices per minute and to only one availability zone per day. Thus, network devices in only a availability zone are changed on any given day.

The information contained in fields 302-308 is then obtained by control plane 108 as the client propagation instructions 210 which may be stored in data store 116. Once a network configuration change request 212 is received by the control plane 108, the network configuration option contained in the state of the network devices that are requested to be changed in the network configuration change request 212 is changed at the rate provided by the configuration propagation instructions 210.

Figure 4:
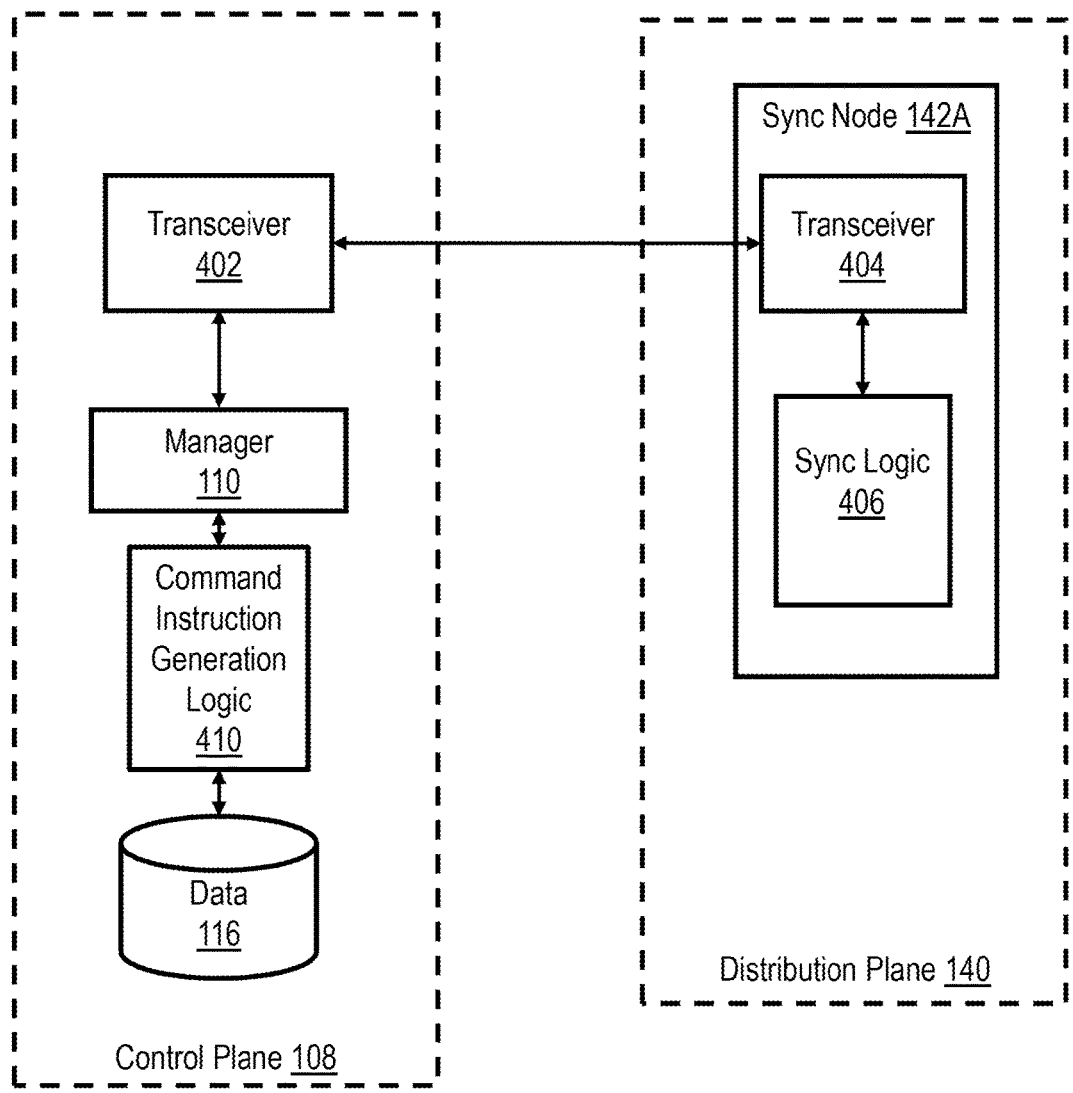
FIG. 4 shows an example of an interaction between a control plane in a distributed computing environment and a synchronization node of a distribution plane in the distributed computing environment, in accordance with various embodiments.

FIG. 4 shows an example of an interaction between control plane 108 in distributed computing environment 100 and synchronization node 142A of distribution plane 140 in the distributed computing environment 100, in accordance with various embodiments. As noted previously, control plane 108 may include manager 110 and data store 116. Additionally, control plane 108 may include transceiver 402 and command instruction generation logic 410. Transceiver 402 is configured to transmit and receive communications from and to the control plane 108. Transceiver 402 may be any type of transceiver including a wired and/or wireless transceiver. More specifically, transceiver 402 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications.

Command instruction generation logic 410 may be hardware and/or software that generates a command instruction that instructs network devices 126A-N and/or 128A-N to change state to a state corresponding with the state information stored in data store 116. For example, a client may request a change to a specific network configuration by transmitting a network configuration change request 212. The control plane 108 then stores state information for a network device that corresponds to the network configuration associated with the network configuration change request 212 in data store 116. In other words, in order to implement the network configuration associated with the network configuration change request 212, the network devices 126A-N and/or 128A-N must be placed into a certain state. The state that the network device 126A-N and/or 128A-N must be placed in order to implement the network configuration associated with the network configuration change request 212 is stored in data store 116. Command generation logic 410 generates a command instruction that instructs the network devices 126A-N and/or 128A-N to configure itself to the state corresponding to the network configuration associated with the network configuration change request 212 that is stored in data store 116. For example, the network configuration associated with the network configuration change request 212 may require that network devices 126A-N alter their state (i.e., the stored information within network device at a given instant in time). The command generation logic 410 then may generate a command instruction. The command instruction may contain the information or state that the network devices 126A-N needs to implement the network configuration change request. Thus, in an example, the command instruction may contain an instruction for the network devices 126A-N to route specific packets utilizing a certain mapping. Thus, in this example, the command instruction may contain a request to change an elastic IP address or a private IP address in the network devices 126A-N.

Manager 110 receives the command instruction from command instruction generation logic 410 and the configuration propagation instructions 210 from data store 116. Manager 110 generates a control signal that provides the propagation rate for the command instruction in accordance with the rules provided in the configuration propagation instructions 210. Transceiver 402 transmits the command instruction and the control signal to the synchronization node 142A in the distribution plane 140.

Synchronization node 142A may include transceiver 404 and synchronization logic 406. Transceiver 404 is configured to transmit and receive communications from and to the synchronization node 142A. Like transceiver 402, transceiver 404 may be any type of transceiver including a wired and/or wireless transceiver. More specifically, transceiver 404 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications. Transceiver 404 may be configured to receive the command instruction and control signal from control plane 108 and distribute the command instruction and control signal to synchronization logic 406.

Synchronization logic 406 is configured to perform certain processing functions for synchronization node 142A. For example, synchronization logic 406 is configured to determine which network device group 124 and network devices 126A-N and/or 128A-N to distribute the command instructions (i.e., to implement the network configuration change request 212). The synchronization logic 406 processes the control signal to determine the rate at which to propagate the command instruction to the network devices 126A-N and/or 128A-N. Synchronization logic 406 then provides the push and pull logic to distribute the command instructions to the network devices 126A-N and/or 128A-N at the rate provided by the configuration propagation instructions 210 via the control signal. Each of synchronization nodes 142A-N has similar hardware and/or software and functionality.

Figure 5:
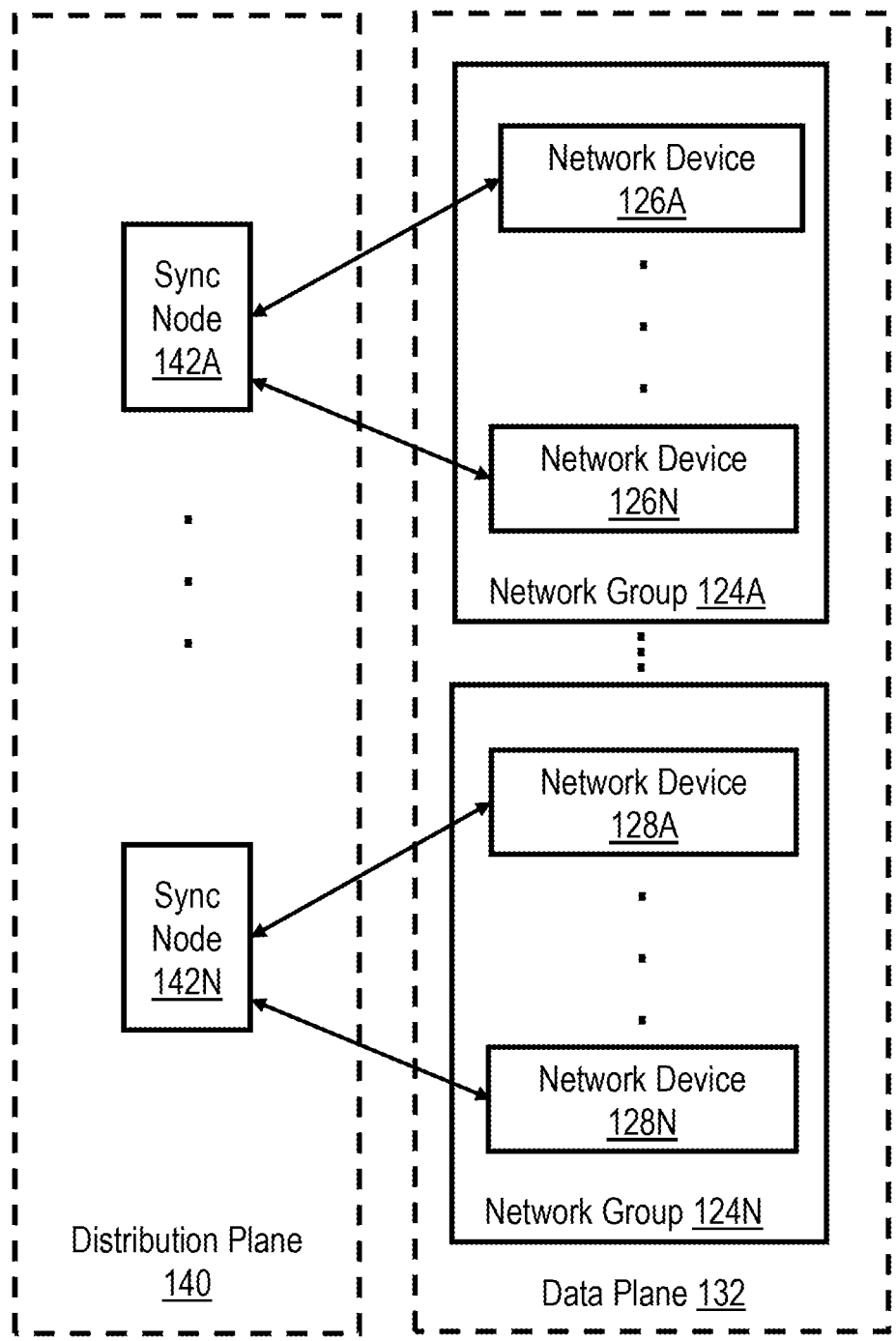
FIG. 5 shows an example of an interaction between synchronization nodes of a distribution plane in a distributed computing environment and network devices of a data plane in the distributed computing environment, in accordance with various embodiments.

FIG. 5 shows an example of an interaction between synchronization nodes 142A-N of distribution plane 140 in distributed computing environment 100 and network devices 126A-N and 128A-N of data plane 132 in the distributed computing environment 100, in accordance with various embodiments. In some embodiments, synchronization node 142A is configured to transmit command instructions to the network devices 126A-N of network device group 124A while synchronization node 142N is configured to transmit command instructions to the network devices 128A-N of network device group 124N. Thus, each synchronization node 142A-N may be configured to distribute command instructions to a different network device group 124.

As discussed previously, synchronization node 142A is configured to distribute command instructions to the network devices 126A-N at a rate provided by the configuration propagation instructions 210. For example, if the dialog 301 from FIG. 3 comprises the configuration propagation instructions 210, then synchronization node 142A transmits the command instructions to ten network devices in network device group 124A every minute. Once each network device receives the command instruction, the network device implements the command instruction by altering its state in accordance with the command instruction. Similarly, synchronization node 142N is configured to distribute command instructions to the network devices 128A-N at a rate provided by the configuration propagation instructions 210. For example, if the dialog 301 from FIG. 3 comprises the configuration propagation instructions 210, then synchronization node 142N transmits the command instructions to five network devices in network device group 124N every minute. Once each network device receives the command instruction, the network device implements the command instruction by altering its state in accordance with the command instruction.

Figure 6:
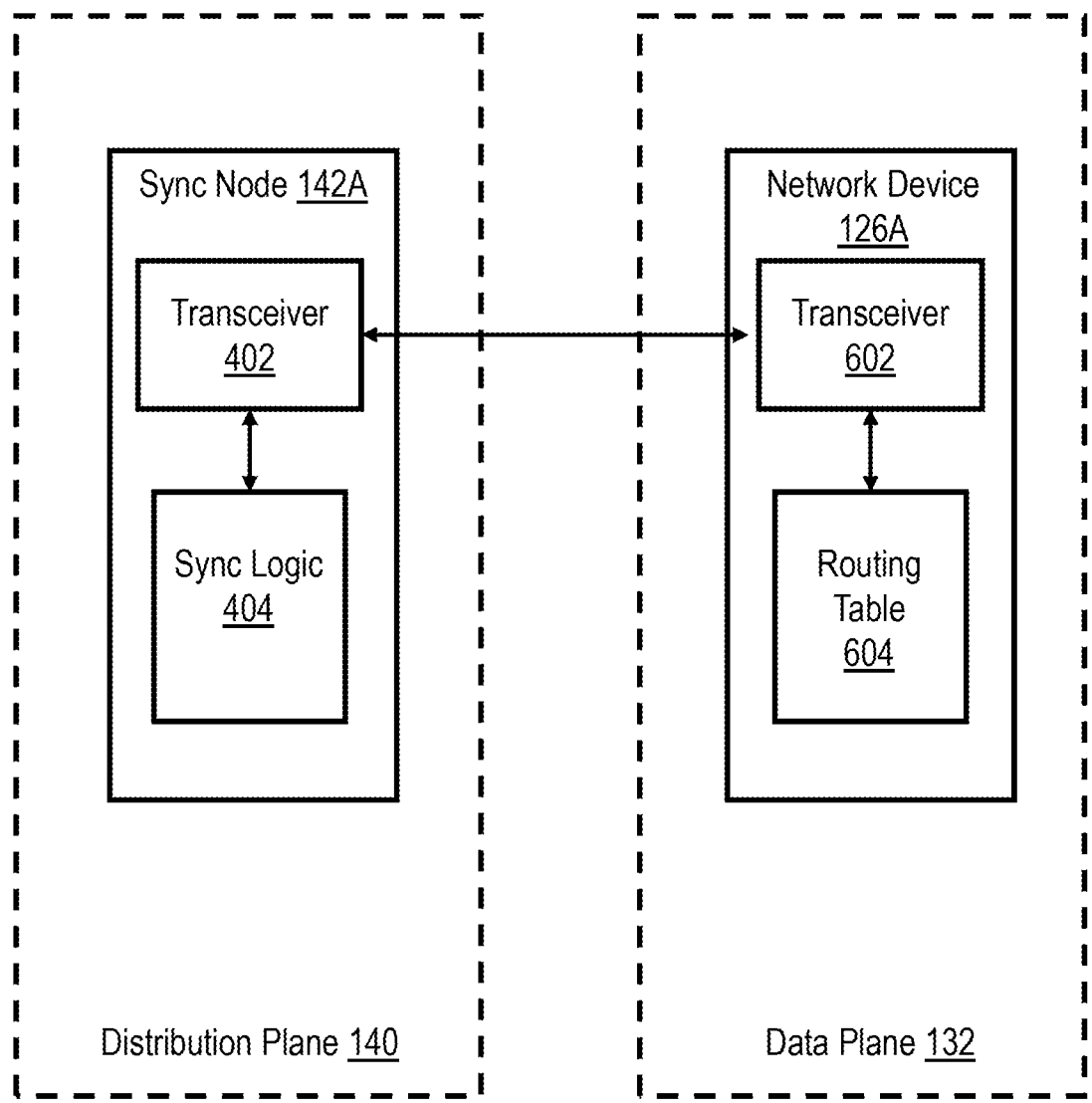
FIG. 6 shows an example of an interaction between a synchronization node of a distribution plane in a distributed computing environment and a network device of a data plane in the distributed computing environment, in accordance with various embodiments.

FIG. 6 shows an example of an interaction between synchronization node 142A of distribution plane 140 in distributed computing environment 100 and network device 126A of data plane 132 in the distributed computing environment 100, in accordance with various embodiments. The synchronization logic 404 provides the command instructions to transceiver 402 and instructs the transceiver 402 to transmit the command instruction at the rate provided by the configuration propagation instructions 210. The command instruction is received by the transceiver 602 of network device 126A. Transceiver 602 is configured to transmit and receive communications from and to the network device 126A. Like transceivers 402 and 404, transceiver 602 may be any type of transceiver including a wired and/or wireless transceiver. More specifically, transceiver 602 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications. Transceiver 602 may be configured to receive the command instruction from synchronization node 142A. The command instruction then may alter the state of network device 126A by amending the routing information contained in routing table 604 such that data packets are routed in accordance with the network configuration change request 212 received from the client 102. In this way, a client 102's requested network configuration may be implemented in the network devices 126A-N and/or 128A-N of the data plane 132 of the distributed computing environment 100.

Figure 7:
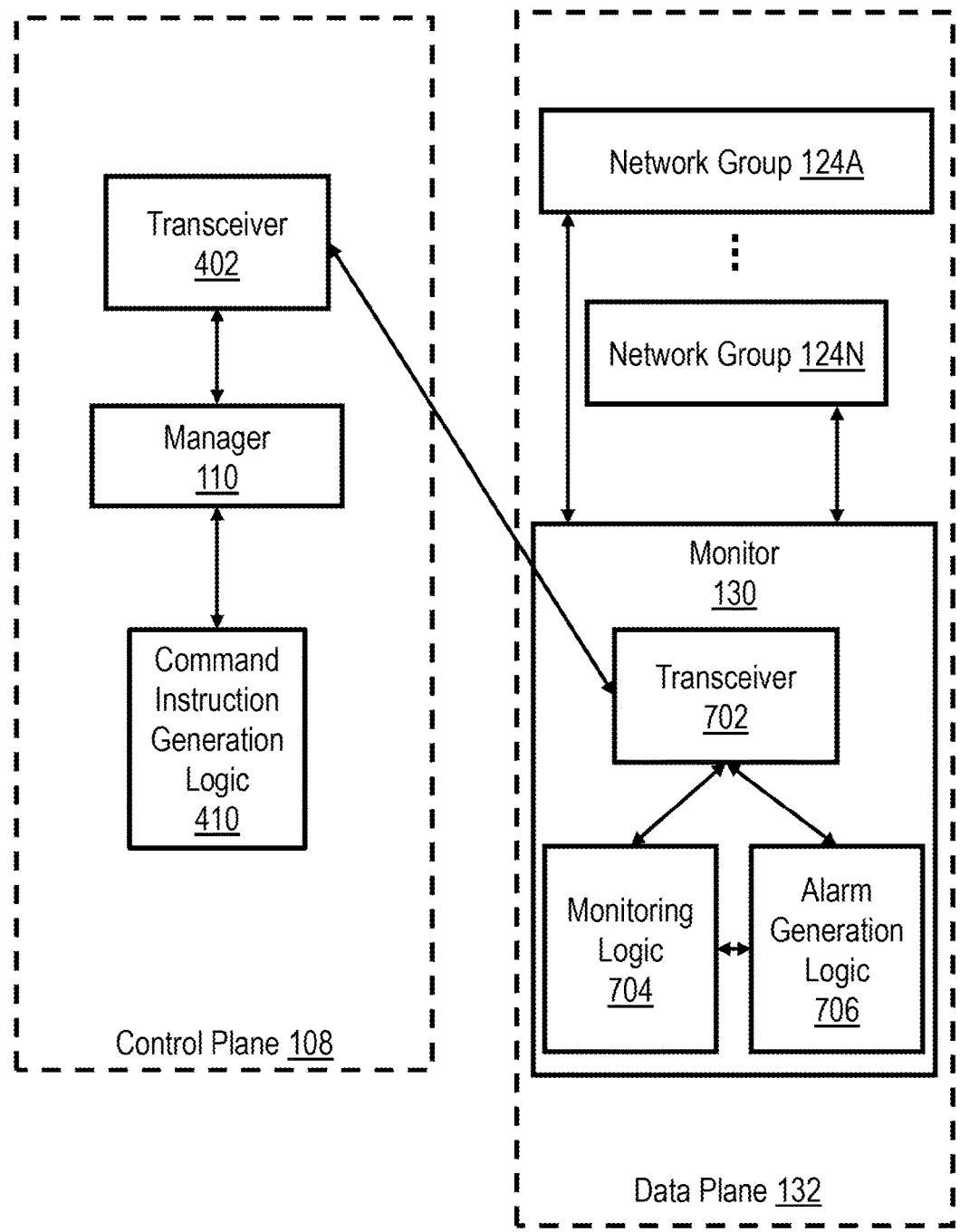
FIG. 7 shows an example of an interaction between a monitor and network device groups of a data plane in a distributed computing environment and a control plane in the distributed computing environment, in accordance with various embodiments.

FIG. 7 shows an example of an interaction between monitor 130 and networking groups 124 of data plane 132 in a distributed computing environment 100 and control plane 108 in the distributed computing environment 100, in accordance with various embodiments. As noted previously, data plane 132 may include network device groups 124A-N and monitor 130. Monitor 130 may include transceiver 702, monitoring logic 704, and alarm generation logic 706. Transceiver 704 is configured to transmit and receive communications from and to the monitor 130. Like transceivers 402, 404, and 602, transceiver 702 may be any type of transceiver including a wired and/or wireless transceiver. More specifically, transceiver 702 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications. Transceiver 702 may be configured to transmit an alarm to the control plane 108, in some embodiments, via distribution plane 140.

Monitoring logic 704 is configured to monitor the network traffic generated by, received by, and/or transmitted between the network devices of the network device groups 124A-N. For example, monitoring logic 704 may monitor the number of data packets and/or the number of bytes transferred into and out of each of network devices of the network device groups 124A-N, the number of data packets dropped amongst the network devices of network device groups 124A-N, and/or the number of data packets allowed (i.e., received) amongst the network devices of network device groups 124A-N. Thus, the monitoring logic 704, in some embodiments, may determine the number of data packets and/or the number of bytes transferred into and out of each of network devices of the network device groups 124A-N, the number of data packets dropped amongst the network devices of network device groups 124A-N, and/or the number of data packets allowed (i.e., received) amongst the network devices of network device groups 124A-N over a predetermined period of time (e.g., one minute, one hour, one day, one week, etc.) as monitored data. This monitored data then may be distributed to the alarm generation logic 706. This monitoring may occur while the command instruction that implements the network configuration change request 212 is propagating at a rate determined by the configuration propagation instructions 210 through the network devices of the network device groups 124A-N.

Alarm generation logic 706 receives the monitored data from the monitoring logic 704. In some embodiments, the monitored data may then be utilized by the alarm generation logic 706 to develop a threshold value of an amount of network traffic acceptable to the provider network. For example, the alarm generation logic 706 may generate a threshold value at which the number of data packets being dropped is unacceptable to the network (e.g., causes the network to fail to meet a service level agreement (SLA)). This threshold value may be based on the monitored data. In some embodiments, the threshold value is based on the average or median amount of traffic monitored by monitoring logic 704 during the predetermined time period (e.g., 60% of the average or median amount of network traffic or double the number of dropped packets over the predetermined time period). For example, if the average or median number of dropped packets amongst network devices in network device groups 124A-N is 1000 over a one minute time period, then the threshold value may be based on the 1000 dropped packets. Therefore, in an example, the threshold value may be double this median number of dropped packets (i.e., 2000 dropped packets) over the predetermined time period (i.e., over one minute). In alternative embodiments, the threshold value is based on a SLA itself. For example, if an SLA requires a network provider to provide a certain amount of network throughput, the threshold value generated by the alarm generation logic 706 may be determined such that the amount of network traffic is at the threshold value whenever the amount of network throughput fails to meet the SLA requirement. In yet further embodiments, the threshold value may be provided by the client 102 as part of the configuration propagation instructions 210 and/or network configuration change request 212.

The alarm generation logic 706 may also compare the amount of network traffic generated by, received by, and/or transmitted between the network devices of the network device groups 124A-N to the threshold value. For example, the alarm generation logic 706 may compare the number of data packets dropped amongst the network devices of the network device groups 124A-N over the predetermined time period to the threshold value. If the amount of threshold traffic is outside the threshold value, then alarm generation logic 706 may generate an alarm. In some embodiments, the amount of network traffic being outside the threshold value is determined by determining that the number of data packets dropped amongst the network devices of the network device groups 124A-N is greater than a dropped packet threshold value. For example, if the threshold value for the number of dropped packets is 2000 dropped packets over a one minute time period and if the monitoring logic 704 determines that 2010 packets were dropped over the past minute, then the alarm generation logic 706 generates an alarm.

If an alarm is generated, the alarm is distributed to transceiver 702 and transmitted to transceiver 402 of the control plane 108, sometimes via any of synchronization nodes 142A-N of the distribution plane 140. In the control plane 108, the alarm is distributed from transceiver 402 to manager 110. Manager 110 then may cancel (i.e., stop) transmission of the command instruction containing the network configuration change request 212 to any remaining network devices 126A-N and/or 128A-N that have yet to receive the command instruction. In other words, manager 110 stops transmission of any additional command instructions containing the network configuration change request 212. Therefore, no additional network devices will receive the command instruction and alter its state. For example, if, at the time the alarm is generated by alarm generation logic 706, only two network devices, out of an intended 100 network devices, have received the command instruction and changed state to implement the network configuration change request, then 98 of the network devices will not have received the command instruction and will remain in the same state as when the network configuration change request was received from the client 102.

Additionally, the manager 110 may cause the command instruction generation logic 410 to generate a second command instruction that instructs network devices that received the command instruction containing the network configuration change request 212 to revert to their immediate previous state. In other words, in response to receiving the alarm, the command instruction generation logic 410 may generate a command instruction that causes the network devices 126A-N and/or 128A-N that have already received the command instruction containing the network configuration change request 212 and implemented the network configuration change request 212 to revert to the state the network devices were in prior to implementing the network configuration change request 212. Hence, the network configuration of the network device groups 124A-N is configured to the same configuration as if a network configuration change request was never received from the client 102.

Figure 8:
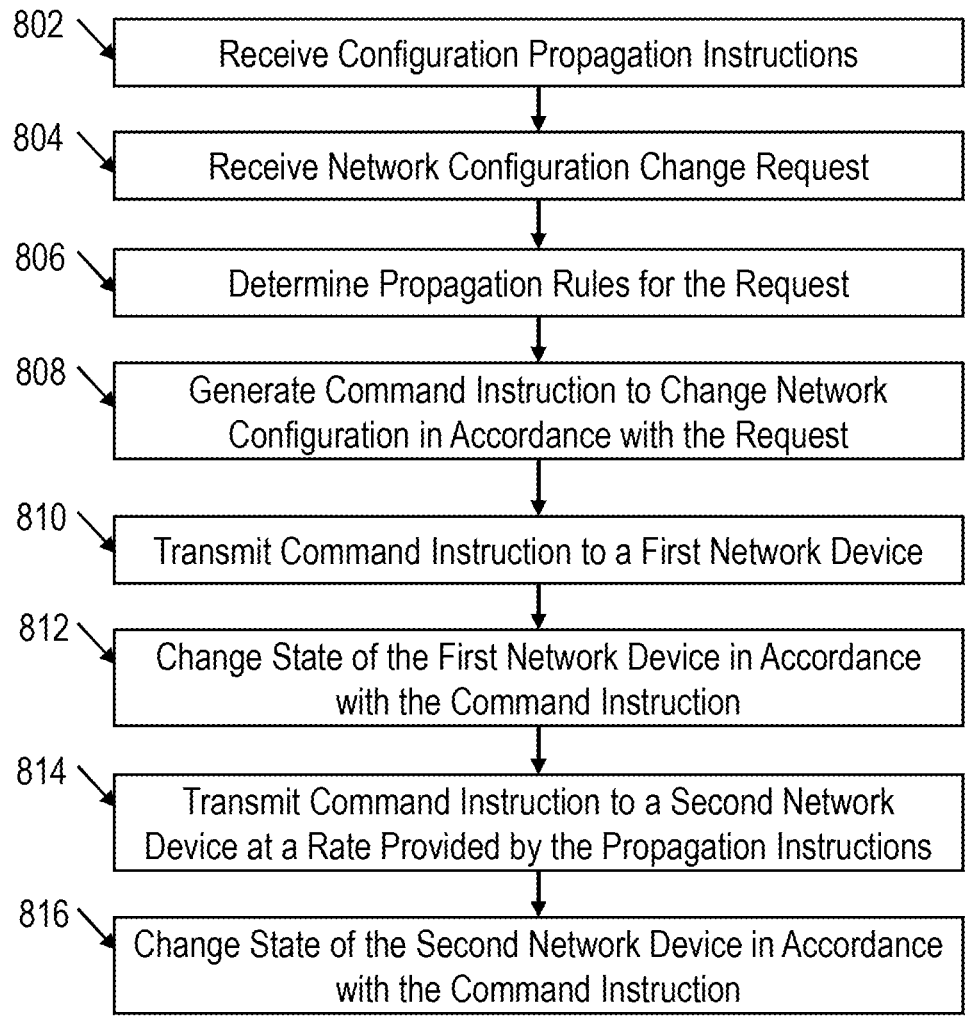
FIG. 8 shows a flow diagram illustrating aspects of operations that may be performed to propagate network configuration changes in a distributed computing environment, in accordance with various embodiments.

FIG. 8 shows a flow diagram illustrating aspects of operations that may be performed to propagate network configuration changes in a distributed computing environment, in accordance with various embodiments. As shown in element 802, configuration propagation instructions are received. The configuration propagation instructions, such as configuration propagation instructions 210, may be received by a control plane, such as control plane 108, from a client, such as client 102. The configuration propagation instructions may provide a rate of propagation for network device implementation of network configuration change requests. In other words, the configuration propagation instructions may provide the rate in which command instructions containing a network configuration change request are distributed to different network devices in data plane. In element 804, a network configuration change request is received. The network configuration change request, such as network configuration change request 212, may be received by the control plane from the client. The network configuration change request may comprise a request to change a specific network mapping, subroutes, subnets, elastic IP addresses, private IP addresses, etc.

In element 806, propagation rules for the network configuration change request are determined. For example, monitor 110 may determine the network device groups 124A-N and network devices that require a change in state based on the network configuration change request 212. The monitor 110 may also determine the rate of propagation of the changes to each of the network devices based on a comparison of the configuration propagation instructions 210 with the network devices that are to change. In element 808, a command instruction to change the network configuration is generated in accordance with the network configuration change request. For example, command instruction generation logic 410 may generate a command instruction that instructs each of the network devices 126A-N and/or 128A-N to configure itself to a state corresponding to the network configuration associated with the network configuration change request 212. In other words, the network configuration associated with the network configuration change request 212 may require that network devices 126A-N and/or 128A-N alter their state (i.e., the stored information within network device at a given instant in time). The command generation logic 410 then may generate a command instruction. The command instruction may contain the information or state that the network devices 126A-N and/or 128A-N needs to implement the network configuration change request 212.

In element 810, the command instruction is transmitted to a first network device. For example, the command instruction may be transmitted by transceiver 402 to network device 126A, in some embodiments, via synchronization node 142A. The transceiver 602 of network device 126A may then receive the command instruction. In element 812, the state of the first network device is changed in accordance with the command instruction. For example, after network device 126A receives the command instruction, the network device 126A implements the command instruction by changing state to the state provided in the command instruction. In element 814, the command instruction is transmitted to a second network device at a rate provided by the configuration propagation instructions. For example, the command instruction may be transmitted by transceiver 402 to network device 126N, in some embodiments, via synchronization node 142A at the rate provided in the configuration propagation instructions. For instance, if the configuration propagation instructions 210 provide a rate of propagation of one network device per minute, then the command instruction is transmitted to network device 126N one minute after being transmitted to network device 126A. The transceiver of network device 126N may then receive the command instruction. In element 816, the state of the second network device is changed in accordance with the command instruction. For example, after network device 126N receives the command instruction, the network device 126N implements the command instruction by changing state to the state provided in the command instruction.

Figure 9:
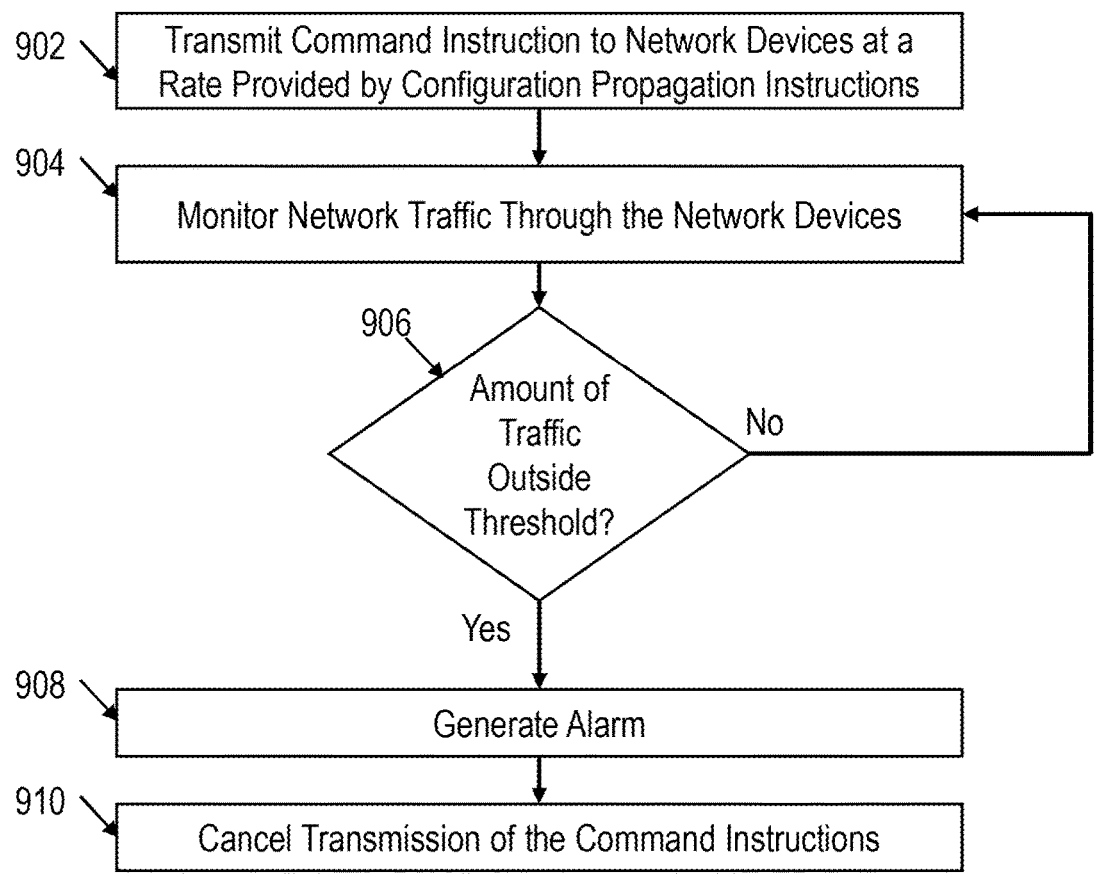
FIG. 9 shows a flow diagram illustrating aspects of operations that may be performed to cancel the propagation of network configuration changes in a distributed computing environment, in accordance with various embodiments.

FIG. 9 shows a flow diagram illustrating aspects of operations that may be performed to cancel the propagation of network configuration changes in a distributed computing environment, in accordance with various embodiments. As shown in element 902 a command instruction is transmitted to network devices at a rate provided by configuration propagation instructions. For example, a command instruction containing network configuration change request 212 may be transmitted to network devices 126A-N of network device group 124A from control plane 108, in some embodiments, via distribution plane 140. If, in this example, configuration propagation instructions provide a rate of propagation of one network device per minute, then the command instruction is transmitted to the first network device, such as network device 126A, and to each subsequent network device one minute after transmitting the command instruction to the previous network device. In element 904, network traffic through the network devices is monitored. For example, monitor 130 may be configured to monitor network traffic (e.g., determine the number of data packets and/or the number of bytes transferred into and out of each of network devices of the network device groups 124A-N, the number of data packets dropped amongst the network devices of network device groups 124A-N, and/or the number of data packets allowed (i.e., received) amongst the network devices of network device group 124A-N) over a predetermined time period.

In element 906, a determination is made as to whether the amount of network traffic is outside a threshold value. For example, alarm generation logic 706 may compare the monitored amount of network traffic to a threshold value. In some embodiments, determining that the amount of traffic is outside a threshold value is made by determining that the number of data packets dropped during the predetermined period of time exceeds a dropped packet threshold value. If, in element 906, a determination is made that the amount of network traffic is not outside a threshold value, then the method continues in element 904 with monitoring the network traffic through the network devices. However, if in element 906, a determination is made that the amount of network traffic is outside a threshold value, then the method continues in element 908 with generating an alarm. For example, if alarm generation logic 706 determines that the amount of network traffic is outside the threshold value (e.g., determines that the number of data packets dropped exceeds a dropped packet threshold value), then the alarm generation logic 706 generates an alarm. In some embodiments, the alarm is transmitted to the control plane 108 via distribution plane 140. In element 910, the transmission of command instructions is cancelled. For example, manager 110 may cancel transmission of the command instruction containing the network configuration change request 212 to any remaining network devices 126A-N and/or 128A-N that have yet to receive the command instruction. In other words, manager 110 stops transmission of any additional command instructions containing the network configuration change request 212. Therefore, no additional network devices will receive the command instruction and alter state.

Figure 10:
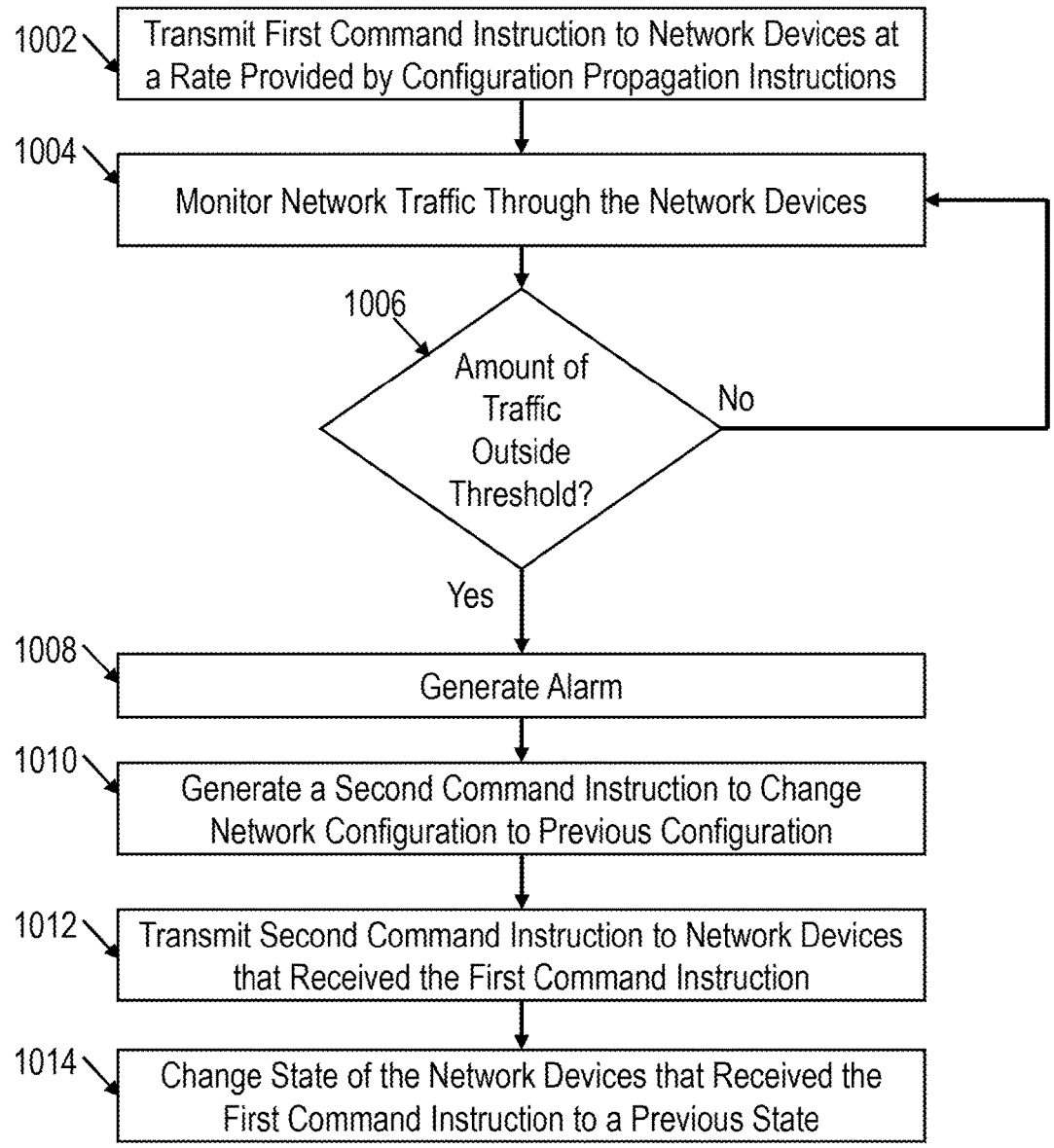
FIG. 10 shows a flow diagram illustrating aspects of operations that may be performed to return network devices to a previous state in a distributed computing environment, in accordance with various embodiments.

FIG. 10 shows a flow diagram illustrating aspects of operations that may be performed to return network devices to a previous state in a distributed computing environment, in accordance with various embodiments. As shown in element 1002 a first command instruction is transmitted to network devices at a rate provided by configuration propagation instructions. For example, a command instruction containing network configuration change request 212 may be transmitted to network devices 126A-N of network device group 124A from control plane 108, in some embodiments, via distribution plane 140. If, in this example, configuration propagation instructions provide a rate of propagation of one network device per minute, then the command instruction is transmitted to the first network device, such as network device 126A, and to each subsequent network device one minute after transmitting the command instruction to the previous network device. In element 1004, network traffic through the network devices is monitored. For example, monitor 130 may be configured to monitor network traffic (e.g., determine the number of data packets and/or the number of bytes transferred into and out of each of network devices of the network device groups 124A-N, the number of data packets dropped amongst the network devices of network device groups 124A-N, and/or the number of data packets allowed (i.e., received) amongst the network devices of network device group 124A-N) over a predetermined time period.

In element 1006, a determination is made as to whether the amount of network traffic is outside a threshold value. For example, alarm generation logic 706 may compare the monitored amount of network traffic to a threshold value. In some embodiments, determining that the amount of traffic is outside a threshold value is made by determining that the number of data packets dropped during the predetermined period of time exceeds a dropped packet threshold value. If, in element 1006, a determination is made that the amount of network traffic is not outside a threshold value, then the method continues in element 1004 with monitoring the network traffic through the network devices. However, if in element 1006, a determination is made that the amount of network traffic is outside a threshold value, then the method continues in element 1008 with generating an alarm. For example, if alarm generation logic 706 determines that the amount of network traffic is outside the threshold value (e.g., determines that the number of data packets dropped exceeds a dropped packet threshold value), then the alarm generation logic 706 generates an alarm. In some embodiments, the alarm is transmitted to the control plane 108 via distribution plane 140.

In element 1010, a second command instruction to change the network configuration to the immediate previous network configuration is generated. For example, the manager 110 may cause the command instruction generation logic 410 to generate a second command instruction that instructs network devices that received the command instruction containing the network configuration change request 212 to revert to their immediate previous state. In other words, in response to receiving the alarm, the command instruction generation logic 410 may generate a command instruction that causes the network devices 126A-N and/or 128A-N that have already received the command instruction containing the network configuration change request 212 and implemented the network configuration change request 212 to revert to the state the network devices were in prior to implementing the network configuration change request 212. In element 1012, the second command instruction is transmitted to the network devices that received the first command instruction. For example, if the first command instruction has been transmitted to network devices 126A and 126N, then the second command instruction is transmitted by transceiver 402 to the transceivers of network devices 126A and 126N. In element 1014, the state of the network devices that received the first command instruction is changed to a previous state. Continuing the previous example, once network devices 126A and 126N receive the second command instruction, then network devices 126A and 126N change their state to the, in some embodiments, immediate previous state. Hence, the network configuration of the network devices 126A and 126N is configured the same as if a network configuration change request was never received from the client 102.

Figure 11:
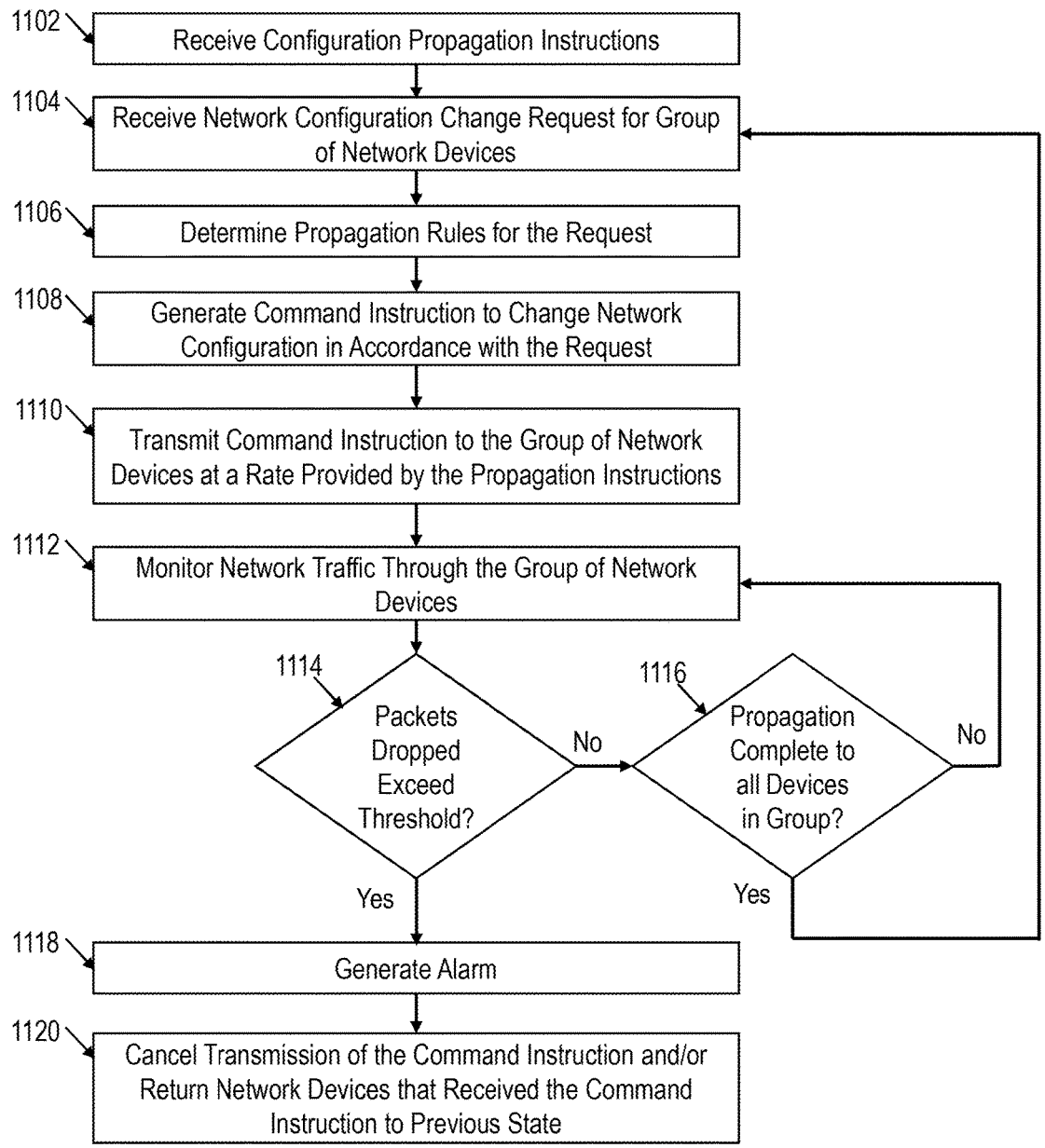
FIG. 11 shows a flow diagram illustrating aspects of operations that may be performed to propagate network configuration changes in a distributed computing environment, in accordance with various embodiments.

FIG. 11 shows a flow diagram illustrating aspects of operations that may be performed to propagate network configuration changes in a distributed computing environment, in accordance with various embodiments. As shown in element 1102, configuration propagation instructions are received. The configuration propagation instructions, such as configuration propagation instructions 210, may be received by a control plane, such as control plane 108, from a client, such as client 102. The configuration propagation instructions may provide a rate of propagation for network device implementation of network configuration change requests. In other words, the configuration propagation instructions may provide the rate in which command instructions containing a network configuration change request are distributed to different network devices in data plane. In element 1104, a network configuration change request is received. The network configuration change request, such as network configuration change request 212, may be received by the control plane from the client. The network configuration change request may comprise a request to change a specific network mapping, subroutes, subnets, elastic IP addresses, private IP addresses, etc.

In element 1106, propagation rules for the network configuration change request are determined. For example, monitor 110 may determine the network device groups 124A-N and network devices that require a change in state based on the network configuration change request 212. The monitor 110 may also determine the rate of propagation of the changes to each of the network devices based on a comparison of the configuration propagation instructions 210 with the network devices that are to change. In element 1108, a command instruction to change the network configuration is generated in accordance with the network configuration change request. For example, command instruction generation logic 410 may generate a command instruction that instructs each of the network devices 126A-N and/or 128A-N to configure itself to a state corresponding to the network configuration associated with the network configuration change request 212. In other words, the network configuration associated with the network configuration change request 212 may require that network devices 126A-N and/or 128A-N alter their state (i.e., the stored information within network device at a given instant in time). The command generation logic 410 then may generate a command instruction. The command instruction may contain the information or state that the network devices 126A-N and/or 128A-N needs to implement the network configuration change request 212.

In element 1110, a command instruction is transmitted to network devices at a rate provided by configuration propagation instructions. For example, a command instruction containing network configuration change request 212 may be transmitted to network devices 126A-N of network device group 124A from control plane 108, in some embodiments, via distribution plane 140. If, in this example, configuration propagation instructions 210 provide a rate of propagation of one network device per minute, then the command instruction is transmitted to the first network device, such as network device 126A, and to each subsequent network device one minute after transmitting the command instruction to the previous network device. In element 1112, network traffic through the network devices is monitored. For example, monitor 130 may be configured to monitor network traffic (e.g., determine the number of data packets and/or the number of bytes transferred into and out of each of network devices of the network device groups 124A-N, the number of data packets dropped amongst the network devices of network device groups 124A-N, and/or the number of data packets allowed (i.e., received) amongst the network devices of network device group 124A-N) over a predetermined time period.

In element 1114, a determination is made as to whether the number of packets dropped amongst the network devices over the predetermined period of time exceeds a threshold value. For example, alarm generation logic 706 may compare the number of dropped packets amongst the network devices over the predetermined period of time to a dropped packet threshold value. If, in element 1114, a determination is made that the number of packets dropped amongst the network devices over the predetermined period of time does not exceed the dropped packet threshold value, then the method continues in element 1116 with determining whether propagation of the command instruction is completed to all the network devices intended to receive the command instructions. For example, if all devices in network device group 124A are to receive the command instruction in order to implement the network configuration change request 212, then a determination is made as to whether all of network devices 126A-N have received the command instruction. If, in element 1116, a determination is made that the propagation of the command instruction has been completed to all the network devices intended to receive the command instructions, then the method continues in element 1104 with receiving another network configuration change request. However, if, in element 1116, a determination is made that the propagation of the command instruction has not been completed to all the network devices intended to receive the command instructions, then the method continues in element 1112 with monitoring the network traffic through the network devices.

If, in element 1114, a determination is made that the number of packets dropped amongst the network devices over the predetermined period of time exceeds the dropped packet threshold value, then the method continues in element 1118 with generating an alarm. For example, if alarm generation logic 706 determines that the number of data packets dropped amongst the network devices over the predetermined period of time exceeds the dropped packet threshold value, then the alarm generation logic 706 generates an alarm. In some embodiments, the alarm is transmitted to the control plane 108 via distribution plane 140. In element 1120, the transmission of command instructions is cancelled and/or the networking devices that received the command instruction are returned to a previous state. For example, manager 110 may cancel (i.e., stop) transmission of the command instruction containing the network configuration change request 212 to any remaining network devices 126A-N and/or 128A-N that have yet to receive the command instruction. In other words, manager 110 stops transmission of any additional command instructions containing the network configuration change request 212. Therefore, no additional network devices will receive the command instruction and alter state. Additionally, manager 110 may cause the command instruction generation logic 410 to generate a second command instruction that instructs network devices that received the command instruction containing the network configuration change request 212 to revert to their immediate previous state. In other words, in response to receiving the alarm, the command instruction generation logic 410 may generate a command instruction that causes the network devices 126A-N and/or 128A-N that have already received the command instruction containing the network configuration change request 212 and implemented the network configuration change request 212 to revert to the state the network devices were in prior to implementing the network configuration change request 212. The second command instruction may be transmitted to the network devices that received the first command instruction, and the state of the network devices that received the first command instruction may be changed to an immediate previous state.

Figure 12:
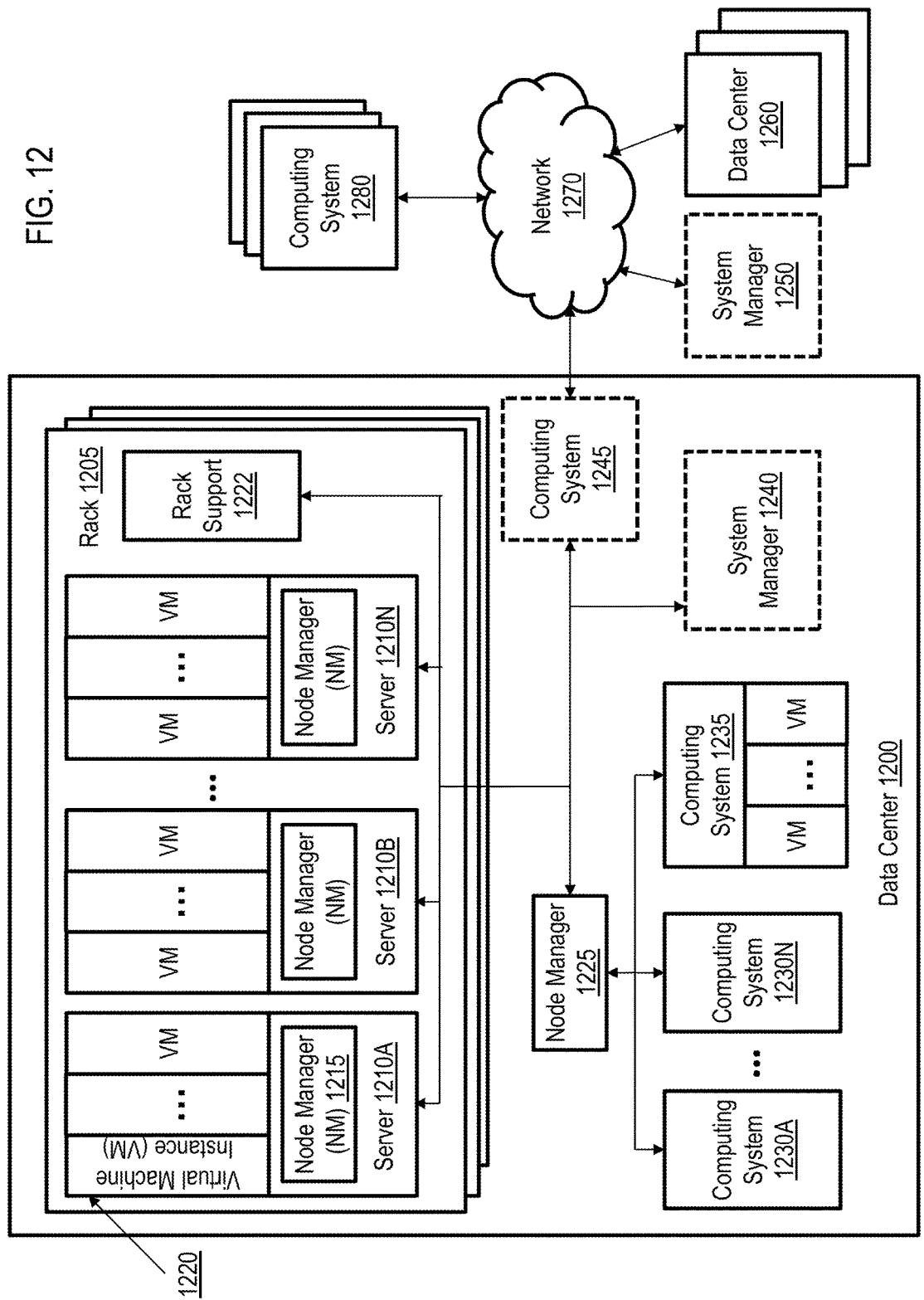
FIG. 12 shows a block diagram of a distributed computing environment, in accordance with various embodiments.

In at least some embodiments, a portion or all of one or more of the technologies described herein, including the techniques to implement the control plane, distribution plane, data plane, and/or network devices (e.g., edge devices, NATs, compute instances, storage instances, hosts, etc.), may be implemented in a distributed computing environment, such as shown in FIG. 12. In particular, in this example a program execution service manages the execution of programs on various computing systems located within a data center 1200. Data center 1200 includes a number of racks 1205, and each rack includes a number of computing systems 1210A-N, as well as a rack support computing system 1222 in this example embodiment. The computing systems 1210 each host one or more virtual machine instances 1220 in this example, as well as a distinct node manager 1215 to manage the virtual machines. In this example, each virtual machine 1220 may be employed to provide an independent computing environment for executing an instance of program. In this example, the rack support computing system 1222 may provide various utility services for other computing systems local to the rack, as well as possibly to other computing systems located in the data center 1200. The utility services may include, for example, data and/or program storage for other computing systems, execution of one or more machine manager modules to support other computing systems, etc. Each computing system 1210 may alternatively have a distinct machine manager module (e.g., provided as part of the node manager for the computing system) and/or have local storage (not shown) to store local copies of programs. The computing systems 1210 and the rack support computing system 1222 all share a common data exchange medium in this example, and may all be part of a single group. This common data exchange medium may be connected to one or more external data exchange mediums shared by, for example, other racks or computing systems in the data center 1200.

In addition, the example data center 1200 further includes additional computing systems 1230A-N and 1235 that share a common data exchange medium with a node manager 1225, and node manager 1225 manages computing systems 1230 and 1235. In the illustrated example, computing system 1235 also hosts a number of virtual machines as execution environments for use in executing program instances for one or more users, while computing systems 1230 do not host distinct virtual machines. In this example, an optional computing system 1245 resides at the interconnect between the data center 1200 and an external network 1270. The optional computing system 1245 may provide a number of services such as acting as a network proxy, managing incoming and/or outgoing data transmissions, etc.

Additionally, an optional system manager computing system 1240 is also illustrated. The optional system manager computing system 1240 may assist in managing the execution of programs on other computing systems located within the data center 1200 (or optionally on computing systems located in one or more other data centers 1260). The optional system manager computing system 1240 may execute a system manager module. A system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc.

In this example, the data center 1200 is connected to a number of other systems via a network 1270 (e.g., the Internet), including additional computing systems 1280 that may be operated by the operator of the data center 1200 or third parties such as clients, additional data centers 1260 that also may be operated by the operator of the data center 1200 or third parties, and an optional system manager 1250. In a manner similar to system manager 1240, the system manager 1250 may manage the execution of programs on computing systems located in one or more data centers 1200 and/or 1260, in addition to providing a variety of other services. Although the example system manager 1250 is depicted as external to any particular data center, in other embodiments it may be located within a data center, such as one of the data centers 1260.

Figure 13:
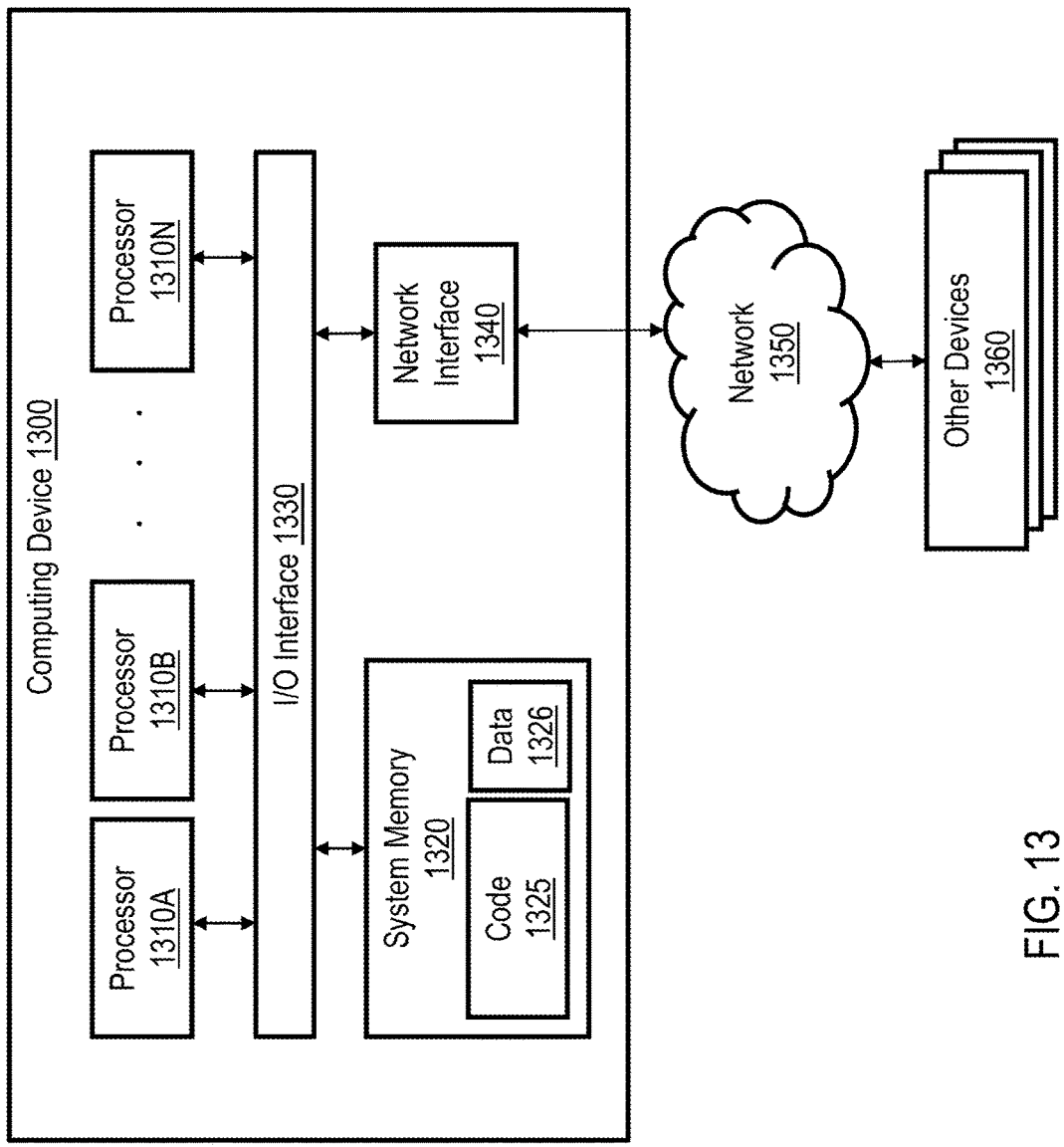
FIG. 13 shows a block diagram illustrating an example computing device, in accordance with various embodiments.

In at least some embodiments, a server that implements a portion or all of one or more of the technologies described herein, including the techniques to implement the control plane, distribution plane, data plane, and/or networking devices (e.g., edge devices, NATs, compute instances, storage instances, hosts, etc.), may include a general-purpose computer system that includes or is configured to access one or more computer-accessible media. FIG. 13 shows such a general-purpose computing device 1300. In the illustrated embodiment, computing device 1300 includes one or more processors 1310 coupled to a system memory 1320 via an input/output (I/O) interface 1330. Computing device 1300 further includes a network interface 1340 coupled to I/O interface 1330.

In various embodiments, computing device 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. In some implementations, graphics processing units (GPUs) may be used instead of, or in addition to, conventional processors. In some embodiments, manager 110, synchronization logic 406, command instruction generation logic 410, monitoring logic 704, and/or alarm generation logic 706 are implemented by processors 1310.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1320 as code 1325 and data 1326

In one embodiment, I/O interface 1330 may be configured to coordinate I/O traffic between processor 1310, system memory 1320, and any peripheral devices in the device, including network interface 1340 or other peripheral interfaces such as various types of persistent and/or volatile storage devices used to store physical replicas of data object partitions. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computing device 1300 and other devices 1360 attached to a network or networks 1350, such as other computer systems or devices as illustrated in FIG. 1 through FIG. 12, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1300 via I/O interface 1330. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Certain terms are used throughout the preceding description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for propagating network configuration changes in a distributed computing system, comprising:

receiving, by a programming interface of a control interface of the distributed computing system, a configuration propagation instruction from a client, the configuration propagation instruction containing information indicative of a number of network devices to receive state changes per unit of time;

receiving, by the programming interface, a network configuration change request from the client, the network configuration change request corresponding to instructions to change a network configuration of a plurality of network devices of a data plane of the distributed computing system;

in response to receiving the network configuration change request, generating, by command instruction generation logic of the control interface, a first command instruction that instructs the plurality of network devices to change from a first state to a second state that corresponds with the network configuration contained in the network configuration change request;

transmitting the first command instruction to at least some of the plurality of network devices at a rate per unit of time provided by the configuration propagation instruction; and changing state of a first network device of the plurality of network devices from the first state to the second state in response to receiving the first command instruction.

2. The method of claim 1, further comprising:

monitoring network traffic of the plurality of network devices; and generating an alarm in response to an amount of the network traffic being outside a threshold value.

3. The method of claim 2, further comprising cancelling transmission of the first command instruction prior to the first command instruction being received by a second network device of the plurality of network devices in response to the alarm being generated.

4. The method of claim 2, further comprising:

in response to the alarm being generated, generating, by the command instruction generation logic, a second command instruction that instructs the first network device to change from the second state back to the first state;

transmitting the second command instruction to the first network device; and changing state of the first network device from the second state back to the first state in response to receiving the second command instruction.

5. A system for propagating network configuration changes in a distributed computing system, comprising:

one or more processors; and memory including instructions, that upon being executed by the one or more processors, cause the one or more processors to:

receive a configuration propagation instruction from a client;

receive a network configuration change request from the client;

generate a first command instruction that instructs a plurality of network devices of the distributed computing system to change state from a first state to a second state, the second state corresponding with a network configuration contained in the network configuration change request; and transmit the first command instruction to at least some of the plurality of network devices at a rate provided by the configuration propagation instruction.

6. The system of claim 5, wherein the instructions, upon being executed, further cause the one or more processors to, in response to receiving the first command instruction, change state of a first network device of the plurality of network devices from the first state to the second state.

7. The system of claim 6, wherein the instructions, upon being executed, further cause the one or more processors to monitor network traffic of the plurality of network devices and generate an alarm in response to an amount of the network traffic being outside a first threshold value.

8. The system of claim 7, wherein the amount of the network traffic being outside a threshold value is determined by a number of data packets dropped being greater than a second threshold value.

9. The system of claim 7, wherein the instructions, upon being executed, further cause the one or more processors to cancel transmission of the first command instruction prior to the first command instruction being received by a second network device of the plurality of network devices.

10. The system of claim 7, wherein the instructions, upon being executed, further cause the one or more processors to:

generate a second command instruction that instructs the first network device to change from the second state to the first state;

transmit the second command instruction to the first network device; and change state of the first network device from the second state to the first state.

11. The system of claim 6, wherein the change of state of the first network device from the first state to the second state comprises changing a routing table of the first network device.

12. The system of claim 5, wherein the configuration propagation instruction is configured to instruct a control interface of the distributed computing system of a rate of propagation that the first command instruction is transmitted to the at least some of the network devices.

13. The system of claim 5, wherein the configuration propagation instruction comprises an instruction for each of a plurality of groups of network devices, each of the instructions configured to instruct a control interface of the distributed computing system of a rate of propagation of network changes for network devices in each of the plurality of groups of network devices, and wherein the plurality of network devices is one of the plurality of groups of network devices.

14. The system of claim 5, wherein the distributed computing system is a provider network.

15. The system of claim 5, wherein the instructions, upon being executed, further cause the one or more processors to monitor signals received from a control interface of the distributed computer network for a commit signal and, in response to failing to detect the commit signal within a threshold amount of time after the first command instruction is first transmitted, change state of the first network device from the second state to the first state.

16. A method, comprising:

receiving, by a programming interface of a distributed computing system, a configuration propagation instruction from a client;

receiving, by the programming interface, from the client a first network configuration change request that requests a change to a first network configuration of a first plurality of network devices of a distributed computing system;

generating, by command instruction generation logic, a first command instruction that instructs the first plurality of network devices to change from a first state to a second state, the second state corresponding with the first network configuration; and transmitting the first command instruction to at least some of the first plurality of network devices at a first rate provided by the configuration propagation instruction.

17. The method of claim 16, further comprising:

receiving a second network configuration change request that requests a change to a second network configuration of a second plurality of network devices of the distributed computing system from the client;

generating a second command instruction that instructs the second plurality of network devices to change from a third state to a fourth state, the fourth state corresponding with the second network configuration; and transmitting the second command instruction to at least some of the second plurality of network devices at a second rate provided by the configuration propagation instruction.

18. The method of claim 16, further comprising, changing state of a first network device of the first plurality of network devices from the first state to the second state in response to receiving the first command instruction.

19. The method of claim 16, further comprising:
monitoring a number of data packets dropped by the first plurality of network devices; and
in response to the number of data packets dropped exceeding a threshold value, generating an alarm.

20. The method of claim 19, further comprising, cancelling transmission of the first command instruction prior to the first command instruction being received by a second network device of the first plurality of network devices.

21. The method of claim 19, further comprising:
generating a second command instruction that instructs the first network device to change from the second state to the first state; and
transmitting the second command instruction to the first network device.

* * * * *